United States Patent
Inagaki et al.

(10) Patent No.: US 11,041,577 B2
(45) Date of Patent: Jun. 22, 2021

(54) DOUBLE ECCENTRIC VALVE

(71) Applicant: AISAN KOGYO KABUSHIKI KAISHA, Obu (JP)

(72) Inventors: Takashige Inagaki, Obu (JP); Mamoru Yoshioka, Nagoya (JP); Akihito Kuno, Tokai (JP); Makoto Fukui, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/633,023

(22) PCT Filed: Jul. 19, 2018

(86) PCT No.: PCT/JP2018/027100
§ 371 (c)(1),
(2) Date: Jan. 22, 2020

(87) PCT Pub. No.: WO2019/044245
PCT Pub. Date: Mar. 7, 2019

(65) Prior Publication Data
US 2020/0217430 A1    Jul. 9, 2020

(30) Foreign Application Priority Data

Aug. 31, 2017  (JP) .............................. JP2017-166650

(51) Int. Cl.
*F16K 31/52* (2006.01)
(52) U.S. Cl.
CPC .................................. *F16K 31/521* (2013.01)
(58) Field of Classification Search
CPC ........ F16K 31/521; F16K 1/24; F16K 1/2028; F16K 1/2007; F16K 31/041; F16K 31/535; F02M 26/70
See application file for complete search history.

(56) References Cited

U.S. PATENT DOCUMENTS

| 2017/0152953 A1 | 6/2017 | Misumi et al. |
| 2019/0056032 A1 | 2/2019 | Yoshioka et al. |
| 2019/0257430 A1 | 8/2019 | Yoshioka et al. |

FOREIGN PATENT DOCUMENTS

| JP | 2011-047290 A | 3/2011 |
| JP | 2014-169668 A | 9/2014 |

(Continued)

OTHER PUBLICATIONS

Oct. 9, 2018 Search Report issued in International Patent Application No. PCT/JP2018/027100.

(Continued)

*Primary Examiner* — Marina A Tietjen
(74) *Attorney, Agent, or Firm* — Oliff PLC

(57) ABSTRACT

A double eccentric valve: a valve seat; a rotary shaft; a valve gear with a rotary shaft base end portion; a motor rotating the shaft via a valve gear; bearings supporting the shaft in a cantilever manner; a return spring giving, to the valve gear, spring force for rotating the shaft in a valve body closing direction; and a full-close stopper to restrict valve gear rotation with the shaft when the valve body is fully closed. When the motor is not driven, the valve gear partially contacts the full-close stopper by spring force, moment acting on the valve gear is caused to act on the rotary shaft with the contact point serving as a fulcrum, the rotary shaft is tilted toward the valve seat with the contact point between the rotary shaft and the bearing serving as a fulcrum, and thus, the valve body is pressed against the valve seat.

4 Claims, 19 Drawing Sheets

(56) References Cited

FOREIGN PATENT DOCUMENTS

| | | |
|---|---|---|
| JP | 2015-218833 A | 12/2015 |
| JP | 2017-116011 A | 6/2017 |
| WO | 2016/002599 A1 | 1/2016 |
| WO | 2017/110169 A1 | 6/2017 |

OTHER PUBLICATIONS

Oct. 30, 2019 International Preliminary Report on Patentability issued in International Patent Application No. PCT/JP2018/027100.

DOUBLE ECCENTRIC VALVE

CROSS-REFERENCE TO RELATED APPLICATIONS

This is a US national phase application based on the PCT International Patent Application No. PCT/JP2018/027100 filed on Jul. 19, 2018, and claiming the priority of Japanese Patent Application No. 2017-166650 filed on Aug. 31, 2017, the entire contents of which are herewith incorporated by reference.

TECHNICAL FIELD

The technique disclosed in this description relates to a double eccentric valve including a valve element provided with a rotary shaft as a rotation center that is placed eccentrically from a center of a valve hole of a valve seat and also placed eccentrically from a sealing surface of the valve element.

BACKGROUND ART

Heretofore, as this type of technique, a double eccentric valve described in Patent Document 1 indicated below has been known, for example. The double eccentric valve includes a valve seat provided with a valve hole in a passage of a housing, a valve element allowed to be seated on the valve seat, and a rotary shaft to rotate the valve element. This double eccentric valve includes the rotary shaft having an axial line extending in parallel to a radial direction of the valve element and the valve hole, the axial line being placed eccentrically from a center of the valve hole to another radial direction of the valve hole and includes the valve element having a sealing surface positioned eccentrically from the axial line of the rotary shaft in a direction in which an axial line of the valve element extends. The double eccentric valve is further provided with a motor (a drive source) to generate a drive force to rotate the rotary shaft in a valve-opening direction, a main gear (a valve gear) provided integrally with the rotary shaft to receive the drive force, a bearing placed in a position between the valve element and the valve gear with respect to an axial direction of the rotary shaft to support the rotary shaft, and a return spring to generate a spring force to rotate the rotary shaft in a valve-closing direction. The double eccentric valve is made to generate a force acting in a direction vertical to an axial line of the bearing and urging the valve element to move away from the valve seat by tilting the rotary shaft at the bearing as a fulcrum so that fixing of the valve seat and the valve element is prevented during non-driving of the motor (non-energization of the motor).

RELATED ART DOCUMENTS

Patent Documents

Patent Document 1: WO2016/002599A1

SUMMARY OF INVENTION

Problems to be Solved by the Invention

However, in the double eccentric valve described in the Patent Document 1, the valve element is separated away from the valve seat by the operation of the return spring during non-energization of the motor, and thereby a clearance is created between the valve seat and the valve element even though fixation of the valve seat and the valve element can be prevented. Therefore, there is a possibility that foreign matters get stuck in the clearance, and it may cause mal-operation of opening and closing the valve element.

This disclosed technique has been made in view of the above circumstances and has an object of providing a double eccentric valve that can keep the valve element pressed against the valve seat to seal the space therebetween during non-driving of the drive source.

Means of Solving the Problems (1) To achieve the above purpose, one aspect of the disclosed technique provides a double eccentric valve comprising: a valve seat including a valve hole and a seat surface formed on an outer periphery of the valve hole; a valve element provided on its outer periphery with a sealing surface corresponding to the seat surface; and a rotary shaft including a leading end portion and a proximal end portion, the leading end portion being integrally provided with the valve element to rotate the valve element, in which an axial line of the rotary shaft extends in parallel to a radial direction of the valve element and the valve hole and is placed eccentrically from a center of the valve hole to another radial direction of the valve hole, and the sealing surface is positioned eccentrically from the axial line of the rotary shaft to a direction in which an axial line of the valve element extends such that the valve element is rotated by rotation of the rotary shaft between a fully-closed position where the valve element is seated on the valve seat and a fully-open position where the valve element is furthest away from the valve seat, wherein the double eccentric valve comprises: a drive source to generate a drive force to rotate the rotary shaft; a valve gear integrally provided with the proximal end portion of the rotary shaft to receive the drive force for rotating the rotary shaft; a bearing placed on a side of the proximal end portion of the rotary shaft to rotatably support the rotary shaft with the leading end portion thereof as a free end in cantilever configuration; a return spring to apply a spring force of rotating the rotary shaft in a direction to close the valve element to the valve gear; and a full-close stopper to which a part of the valve gear is contacted to restrict rotation of the valve gear with the rotary shaft while the valve element is placed in the fully-closed position, and the part of the valve gear is configured to be contacted to the full-close stopper by the spring force applied to the valve gear during non-driving of the drive source to apply the moment acting on the valve gear to the rotary shaft at a contact point of the valve gear with the full-close stopper as a fulcrum, so that the rotary shaft is tilted in its axial direction toward the valve seat to press the valve element against the valve seat at a contact point with the bearing as a fulcrum.

According to the configuration of the above (1), when driving of the drive source is halted in the fully-closed state where the valve element is positioned in the fully-closed position and supply of the drive force to the valve gear is stopped, the valve gear is only subjected to a spring force of the return spring in a direction to close the valve element. At this time, the moment acts on the valve gear at the contact point of the part of the valve gear and the full-close stopper as a fulcrum, and a push-up force by this moment acts on the proximal end portion of the rotary shaft. Thereby, the rotary shaft is tilted to a direction of the axial line of the shaft at the contact point with the bearing as a fulcrum, so that the valve element is pressed against the valve seat.

(2) To achieve the above purpose, in the above configuration (1), the bearing includes a first bearing and a second bearing placed on a side of the proximal end portion of the rotary shaft, the first bearing being placed in a position closer to the valve gear than the second bearing, and the part of the valve gear is configured to be contacted with the full-close stopper by the spring force applied to the valve gear during non-driving of the drive source to apply the moment acting on the valve gear to the rotary shaft at the contact point of the valve gear with the full-close stopper as the fulcrum, so that the rotary shaft is tilted in its axial direction toward the valve seat to press the valve element against the valve seat with keeping a minute clearance from the second bearing at a contact point with the first bearing as the fulcrum.

According to the above configuration (2), in addition to the operation of the above configuration (1), when the rotary shaft is tilted toward the valve seat in its axial direction, the minute clearance is kept between the second bearing and the rotary shaft. Thereby, the rotary shaft and the second bearing are not strictly contacted, so that the valve element is subjected to the maximum force of tilting the rotary shaft.

(3) To achieve the above purpose, in the above configuration (1) or (2), in a state where the valve element in the fully-closed position and where the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant and the contact point of the part of the valve gear and the full-close stopper is placed in the first quadrant or the fourth quadrant such that the spring force acts in a direction to rotate the valve gear in a clockwise direction.

According to the above configuration (3), in addition to the operation of the above configuration (1) or (2), from a positional relation of the valve seat with the valve element and a contact point of the part of the valve gear with the full-close stopper, the force exerted by the moment to tilt the rotary shaft in its axial direction toward the valve seat is made to effectively act on the valve element.

(4) To achieve the above object, in the above configuration (1) or (2), in a state where the valve element in the fully-closed position and where the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant and the contact point of the part of the valve gear with the full-close stopper is placed in the second quadrant or the third quadrant such that the spring force acts in a direction to rotate the valve gear in a counter-clockwise direction.

According to the above configuration (4), in addition to the operation of the above configuration (1) or (2), from a positional relation of the valve seat with the valve element and a contact point of the part of the valve gear with the full-close stopper, the force exerted by the moment to tilt the rotary shaft in its axial direction toward the valve seat is made to effectively act on the valve element.

Effects of the Invention

According to the above configuration (1), the valve element can be pressed against the valve seat to seal both the valve element and the valve seat even during non-driving of the drive source.

According to the above configuration (2), in addition to the above-mentioned effect of the configuration (1), the valve element and the valve seat can be sealed by the maximum force.

According to the above configuration (3), in addition to the above-mentioned effects of the configuration (1) or (2), the valve element can be effectively pressed against the valve seat.

According to the above configuration (4), in addition to the above-mentioned effects of the configuration (1) or (2), the valve element can be effectively pressed against the valve seat.

DESCRIPTION OF EMBODIMENTS

First Embodiment

A detailed description of a first embodiment embodying a double eccentric valve as an exhaust gas recirculation valve (EGR valve) will now be given with reference to the accompanying drawings.

(Configuration of EGR Valve)

Figure 1:
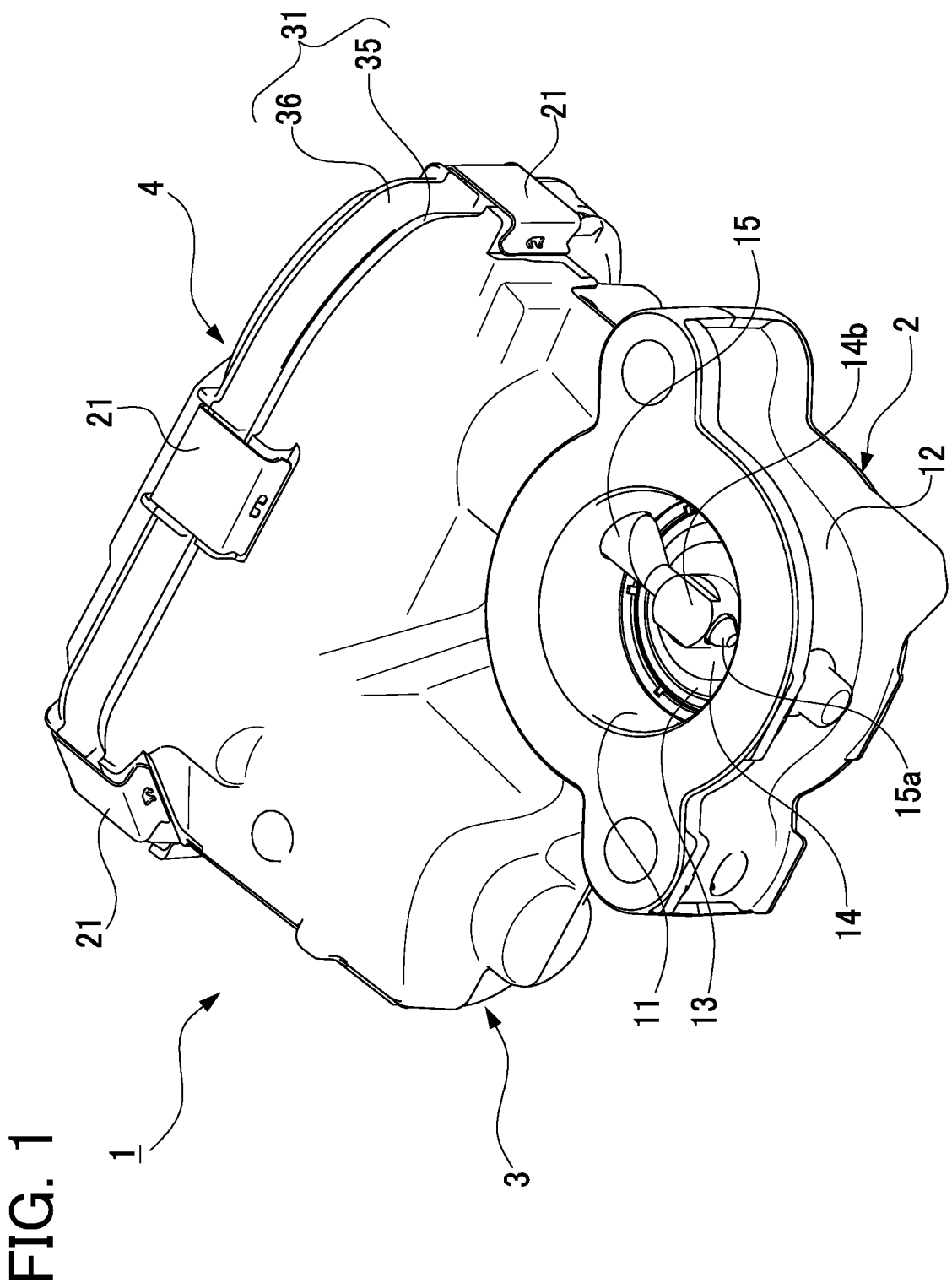
FIG. 1 is a perspective view of an EGR valve constituted of a double eccentric valve in a first embodiment.
Figure 2:
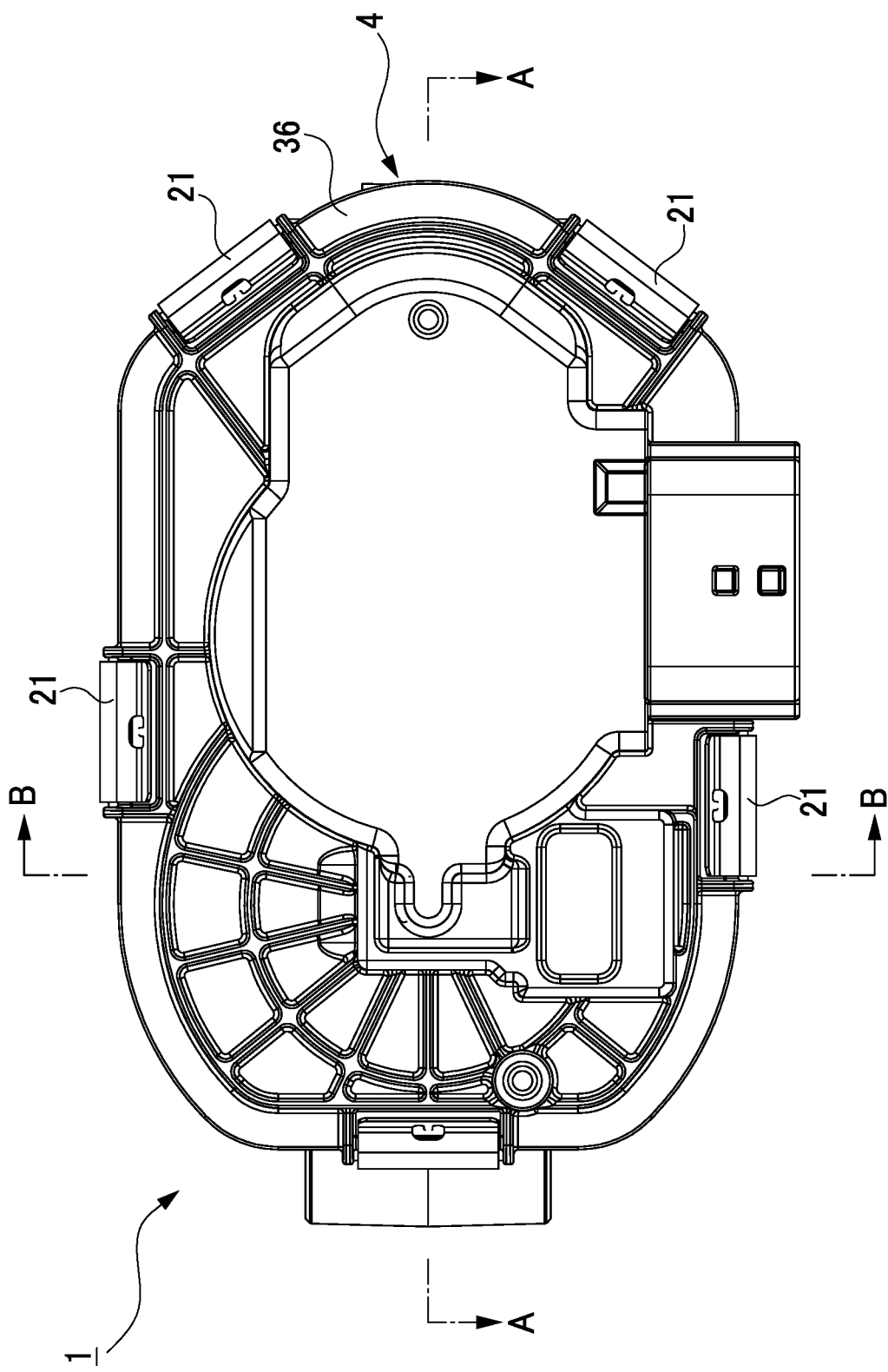
FIG. 2 is a rear view of the EGR valve in the first embodiment.

FIG. 1 is a perspective view of an EGR valve 1 constituted of a double eccentric valve. FIG. 2 is a rear view of the EGR valve 1. As shown in FIG. 1, the EGR valve 1 includes a valve section 2, a motor section 3 mounted with a motor 32 (see FIG. 5), and a speed-reducing mechanism section 4 mounted with a speed-reducing mechanism 33 (see FIG. 5). The valve section 2 includes a pipe 12 provided with a passage 11 in which EGR gas as a fluid flows. In the passage 11, a valve seat 13, a valve element 14, and a part of a rotary shaft 15 are placed. To the rotary shaft 15, a rotational force of the motor 32 is made to be transmitted via the speed-reducing mechanism 33.

Figure 3:
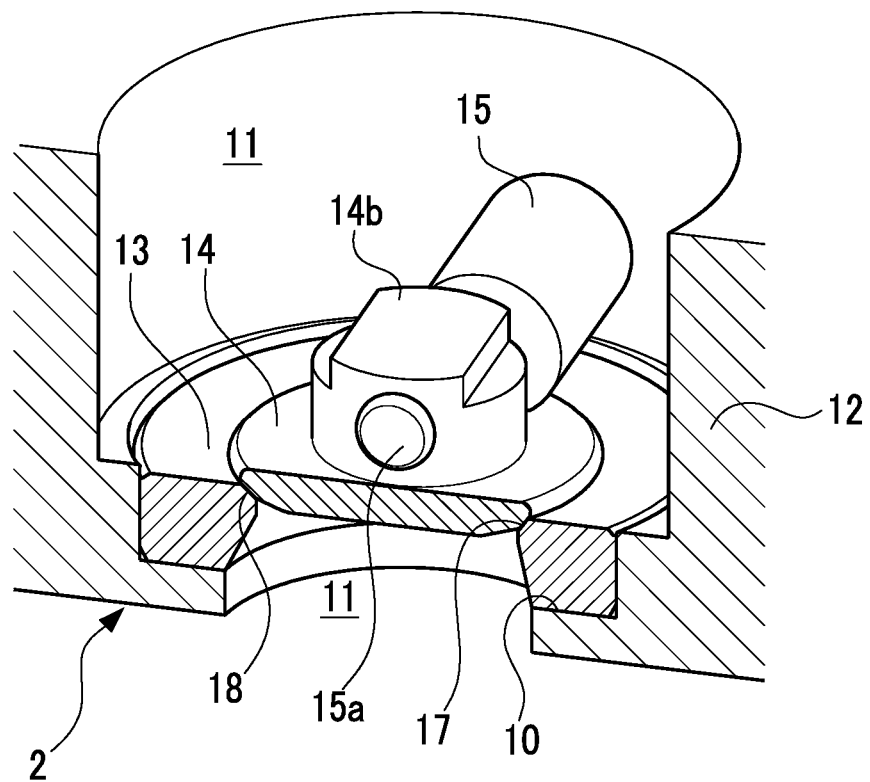
FIG. 3 a partially-cutaway perspective view of a valve section in a fully-closed state in the first embodiment.
Figure 4:
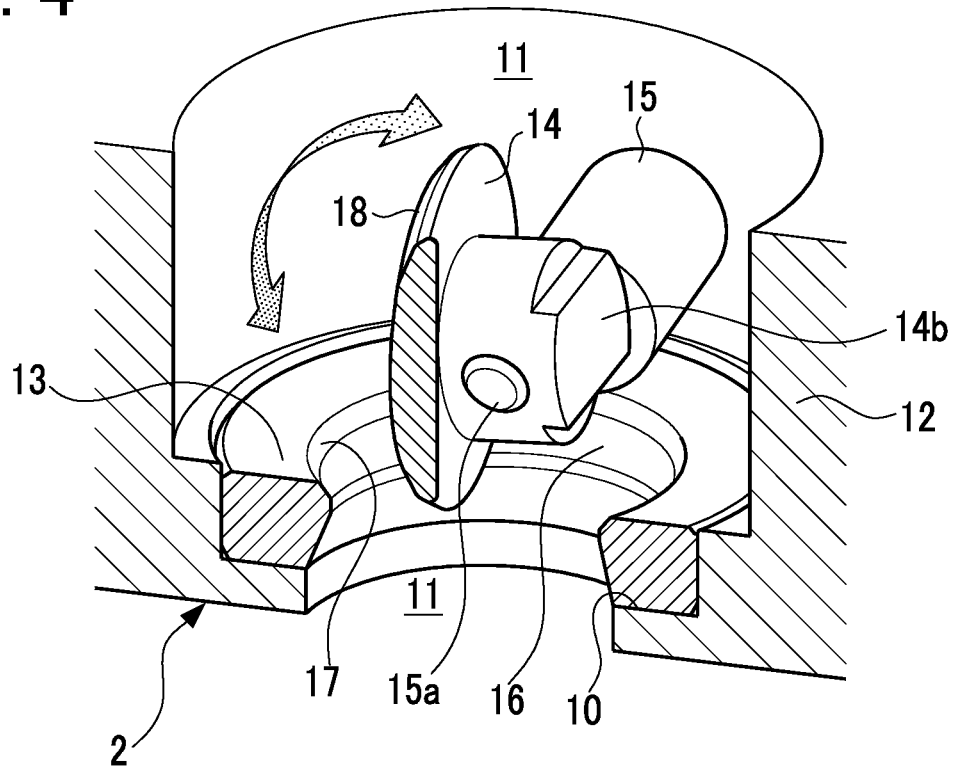
FIG. 4 is a partially-cutaway perspective view of the valve section in a fully-open state in the first embodiment.

FIG. 3 is a partially-cutaway perspective view of the valve section 2 in a state (a fully-closed state) where the valve element 14 is seated on the valve seat 13 at a fully-closed position. FIG. 4 is a partially-cutaway perspective view of the valve section 2 in a state (a fully-open state) where the valve element 14 is furthest away from the valve seat 13 at a fully-open position. As shown in FIGS. 3 and 4, the passage 11 is formed with a step portion 10 in which the valve seat 13 is press-fitted and fixed. The valve seat 13 in an annular shape has a valve hole 16 in its center. The valve hole 16 has an annular seat surface 17 in its edge portion. The valve element 14 has a circular disc shape and is formed on its outer periphery with an annular sealing surface 18 in correspondence with the seat surface 17. The valve element 14 is made to be integrally rotated with the rotary shaft 15. In FIGS. 3 and 4, the passage 11 on an upper side of the valve element 14 indicates an upstream side of the EGR gas flow, and the passage 11 on a lower side of the valve seat 13 indicates a downstream side of the EGR gas flow. Namely, the valve element 14 in the passage 11 is fixed to the rotary shaft 15 upstream of the valve seat 13 in the EGR gas flow.

Figure 5:
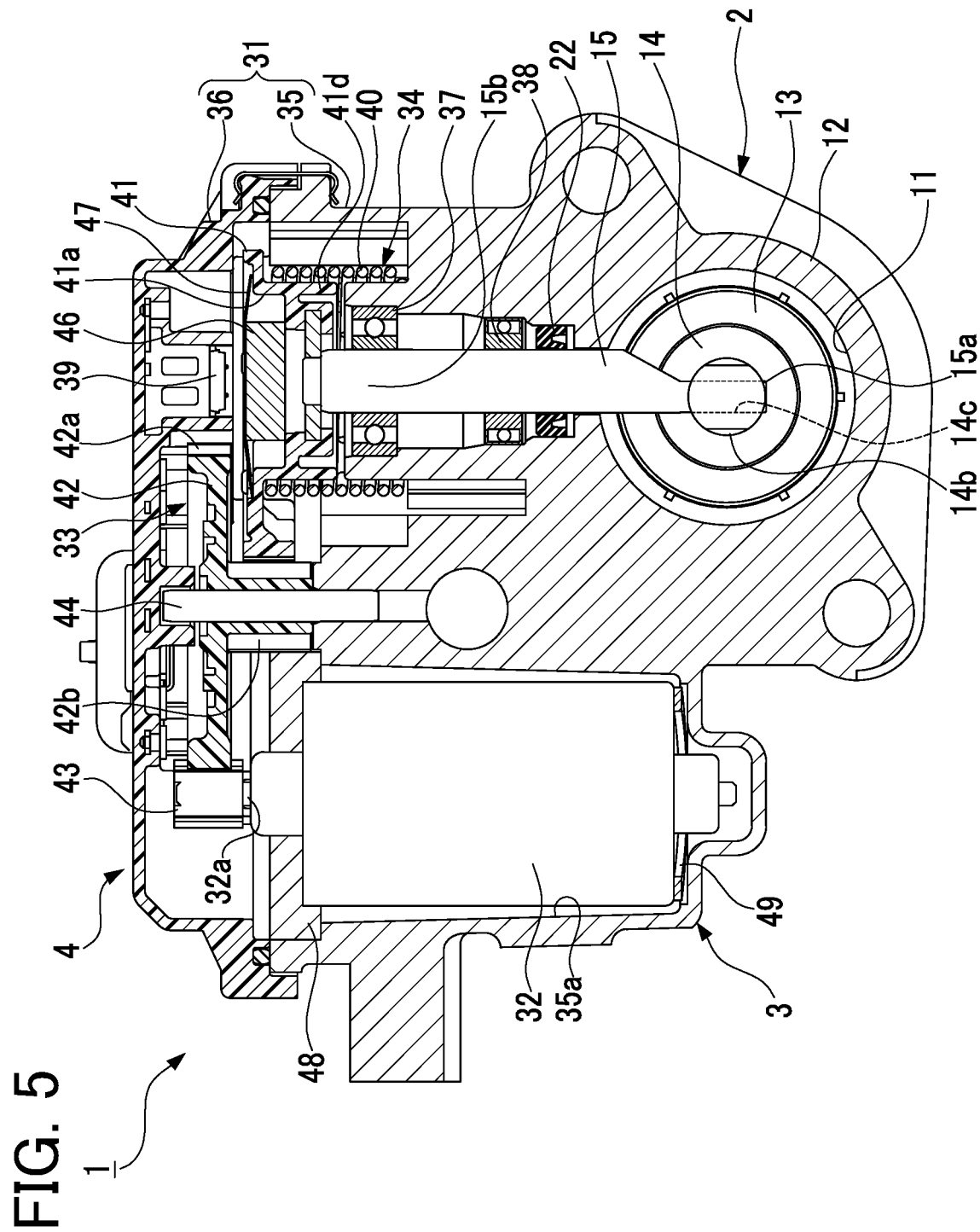
FIG. 5 is a cross-sectional view taken along a line A-A in FIG. 2 showing the EGR valve in the fully-closed state in the first embodiment.
Figure 6:
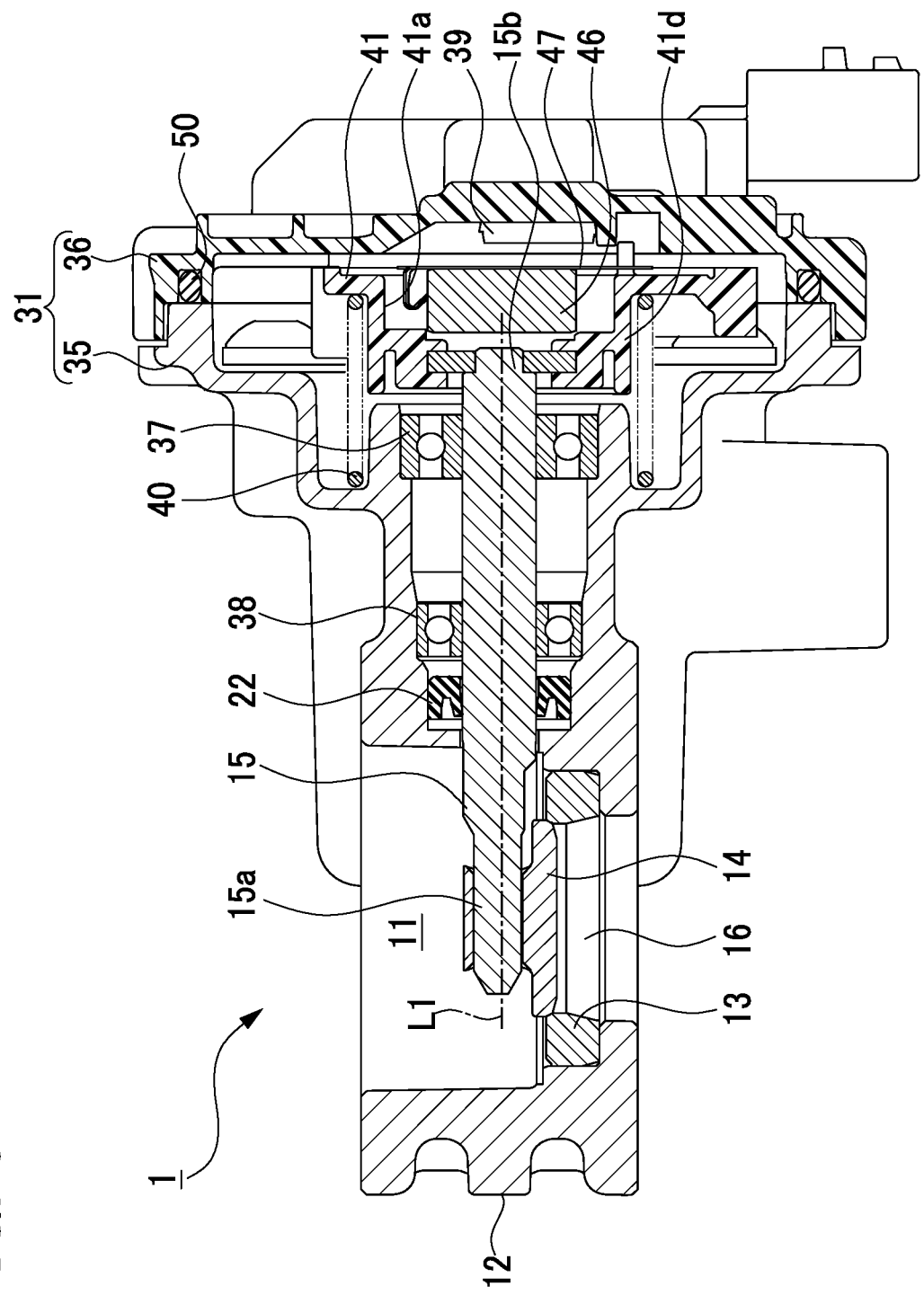
FIG. 6 is a cross-sectional view taken along a line B-B in FIG. 2 showing the EGR valve in the fully-closed state in the first embodiment.

FIG. 5 is a cross-sectional view of the EGR valve 1 in the fully-closed state taken along a line A-A in FIG. 2. FIG. 6 is another cross-sectional view of the EGR valve 1 in the fully-closed state taken along a line B-B in FIG. 2. As shown in FIGS. 5 and 6, as main components other than the valve seat 13, the valve element 14, and the rotary shaft 15, the EGR valve 1 is provided with an EGR body 31, a motor 32, the speed-reducing mechanism 33, and a valve-closing return mechanism 34. The EGR body 31 is provided with an aluminum valve housing 35, which includes the valve section 2, the motor section 3, and a part of the speed-reducing mechanism section 4, and with a synthetic-resin made end frame 36 closing an open end of the valve housing 35 and being constituted of a part of the speed-reducing mechanism section 4. The motor 32 corresponds to one example of a drive source of the present disclosed technique.

As shown in FIGS. 1 and 3 to 6, the rotary shaft 15 includes a pin portion 15a protruding from its leading end and a proximal end portion 15b on an opposite side from the pin portion 15a. The pin portion 15a corresponds to one example of a leading end portion of the rotary shaft 15. The rotary shaft 15 has the pin portion 15a as a free end portion, and a side of this pin portion 15a is placed in the passage 11. The valve element 14 is fixed to the pin portion 15a. Further, the rotary shaft 15 is supported in cantilever configuration in a rotatable manner relative to the valve housing 35 via two bearings of a first bearing 37 and a second bearing 38 that are placed on a side of the proximal end portion 15b. A rubber sealing member 22 is provided between the second bearing 38 and the valve element 14, specifically between the rotary shaft 15 and the valve housing 35. The first bearing 37 and the second bearing 38 are constituted of ball bearings and spaced apart from each other by a predetermined interval. The rotary shaft 15 is inserted in center holes of both the bearings 37 and 38 to be supported in a rotatable manner. The rotary shaft 15 is finely supported with respect to inner peripheries of the bearings 37 and 38, but strictly speaking, there is an allowable minute clearance (clearance of a unit of micron) between an outer periphery of the rotary shaft 15 and inner peripheries of the bearings 37 and 38. As it will be described later, the rotary shaft 15 is allowed to be tilted within this clearance CL (see FIGS. 14 and 15 in which the clearance CL is illustrated exaggeratedly).

Figure 7:
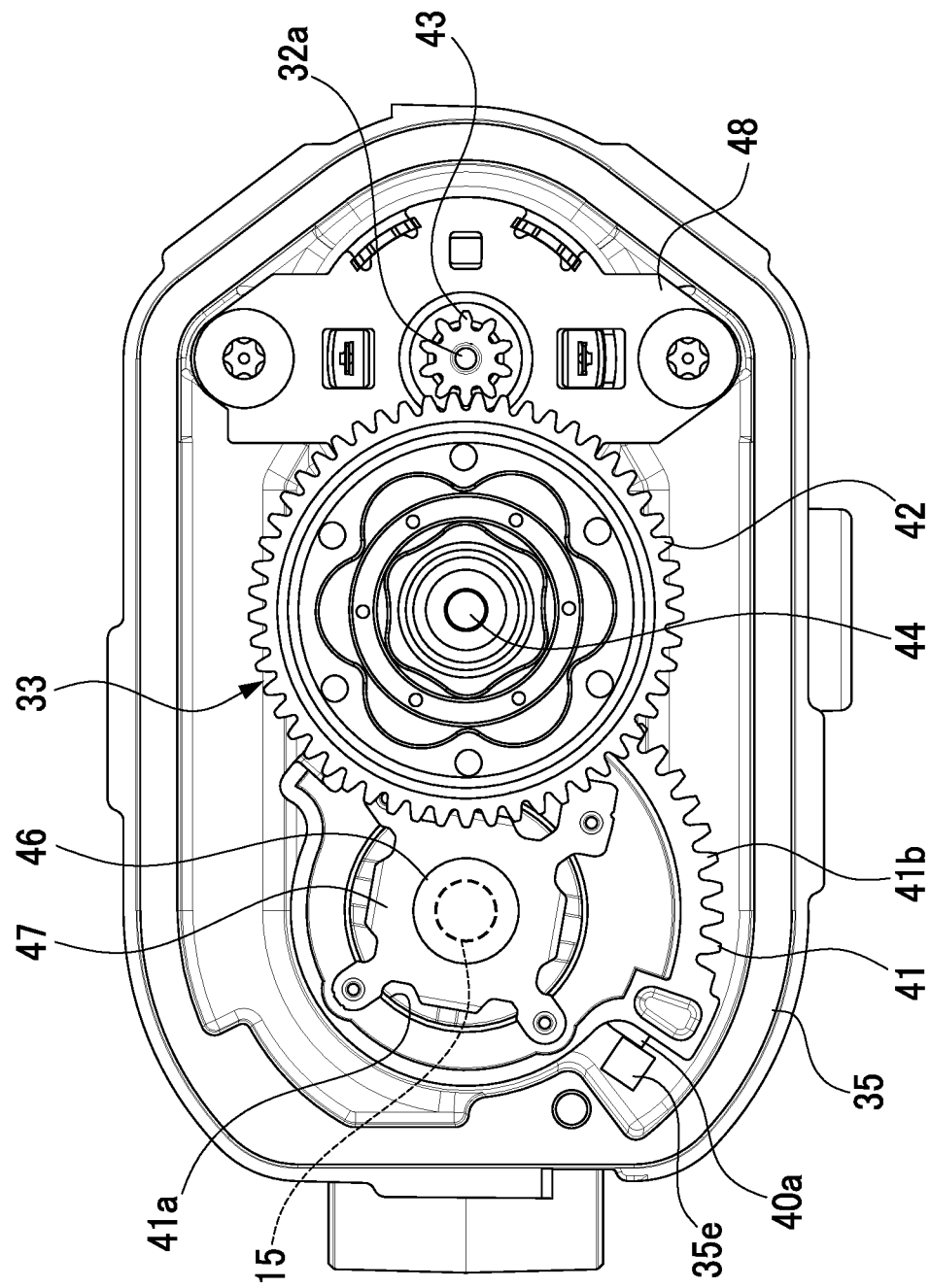
FIG. 7 is a rear view of a state where an end frame has been detached from a valve housing of the EGR valve in the fully-closed state in the first embodiment.

FIG. 7 is a rear view of the EGR valve in the fully-closed state in which the end frame 36 has been detached from the valve housing 35. As shown in FIGS. 1 and 2, the end frame 36 is fixed to the valve housing 35 by a plurality of clips 21. As shown in FIGS. 5 and 6, inside the end frame 36 is provided with an EGR open-degree sensor 39 placed in correspondence with a proximal end of the rotary shaft 15 to detect an open degree (an EGR open degree) of the valve element 14. This EGR open-degree sensor 39 consists of a hall IC or the like and is configured to detect a rotation angle of the rotary shaft 15 as the EGR open degree. Further, as shown in FIGS. 5 to 7, at an edge of the proximal end portion 15b of the rotary shaft 15, a valve gear 41 is fixed. Between the valve gear 41 and the valve housing 35, a return spring 40 to urge the valve element 14 in a valve closing direction is provided. A recessed portion 41a is formed on a front side of the valve gear 41 and a magnet 46 is accommodated in the recessed portion 41a. The magnet 46 is pressed from its upper side and fixed by a retainer plate 47 formed of a leaf spring. By this configuration, integral rotation of the valve element 14 and the rotary shaft 15 by the valve gear 41 leads to changes in a magnetic field of the magnet 46, and the EGR open-degree sensor 39 detects the changes in the magnetic field as the EGR open degree.

As shown in FIG. 5, the motor 32 is housed in a recess 35*a* formed in the valve housing 35. The motor 32 housed in the recess 35*a* is fixed to the valve housing 35 via a stopper plate 48 and a leaf spring 49 that are provided one in each of both ends of the recess 35*a*. The motor 32 is drivingly connected to the rotary shaft 15 through the speed-reducing mechanism 33 to open and close the valve element 14. Namely, on an output shaft 32*a* of the motor 32, a motor gear 43 is fixed. This motor gear 43 is drivingly connected to the valve gear 41 via an intermediate gear 42. The intermediate gear 42 is a two-stage gear including a large-diameter gear 42*a* and a small-diameter gear 42*b* and rotatably supported by the valve housing 35 via a pin shaft 44. The large-diameter gear 42*a* is coupled with the motor gear 43 and the small-diameter gear 42*b* is coupled with the valve gear 41. In the present embodiment, the gears 41 to 43 constitute the speed-reducing mechanism 33. Among the gears 41 to 43, the valve gear 41 and the intermediate gear 42 are made of resin material for weight reduction.

Accordingly, when the motor 32 is energized and operated to rotate the output shaft 32*a* in one direction from the valve fully-closed state of the valve element 14 to further rotate the motor gear 43 in the same direction, the rotational force is reduced its speed by the intermediate gear 42 and then transmitted to the valve gear 41. Thereby, the valve gear 41 is rotated with the rotary shaft 15 and the valve element 14 against a spring force of the return spring 40, thus opening the valve element 14 to open the passage 11. Further, in a state where the valve element 14 is opened to a certain open degree, the motor 32 is energized to generate the rotational force and the thus generated rotational force is transmitted as a retaining force to the rotary shaft 15 and the valve element 14 through the intermediate gear 42 and the valve gear 41. This retaining force makes balance with the spring force of the return spring 40, thereby keeping the certain open degree of the valve element 14.

Figure 8:
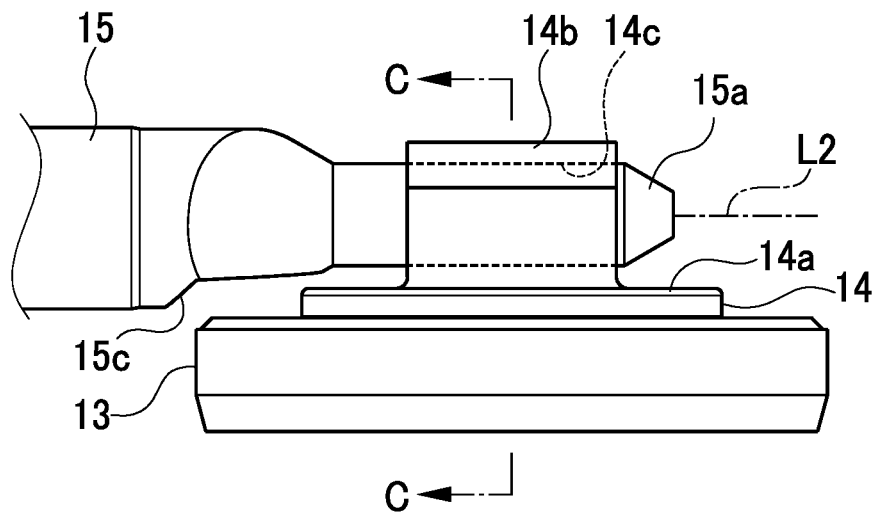
FIG. 8 is a side view of the valve seat, the valve element, and a part of a rotary shaft in the fully-closed state in the first embodiment.
Figure 9:
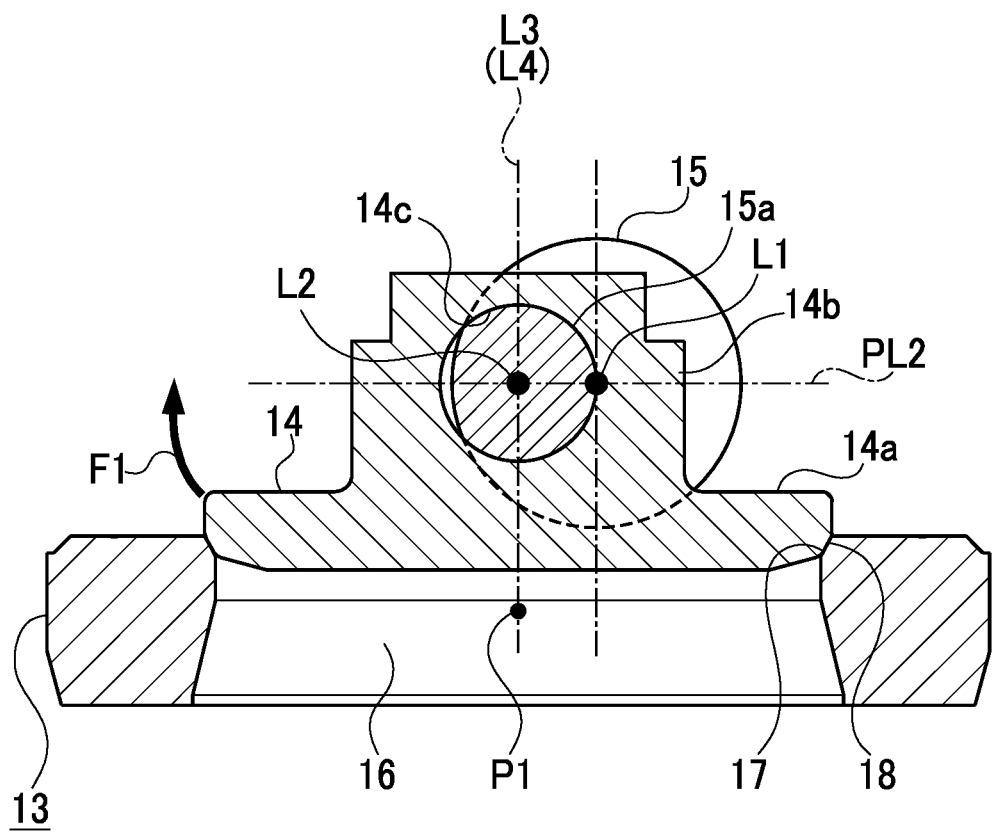
FIG. 9 is a cross-sectional view taken along a line C-C in FIG. 8 showing the valve seat, the valve element, and the part of the rotary shaft in the fully-closed state in the first embodiment.
Figure 10:
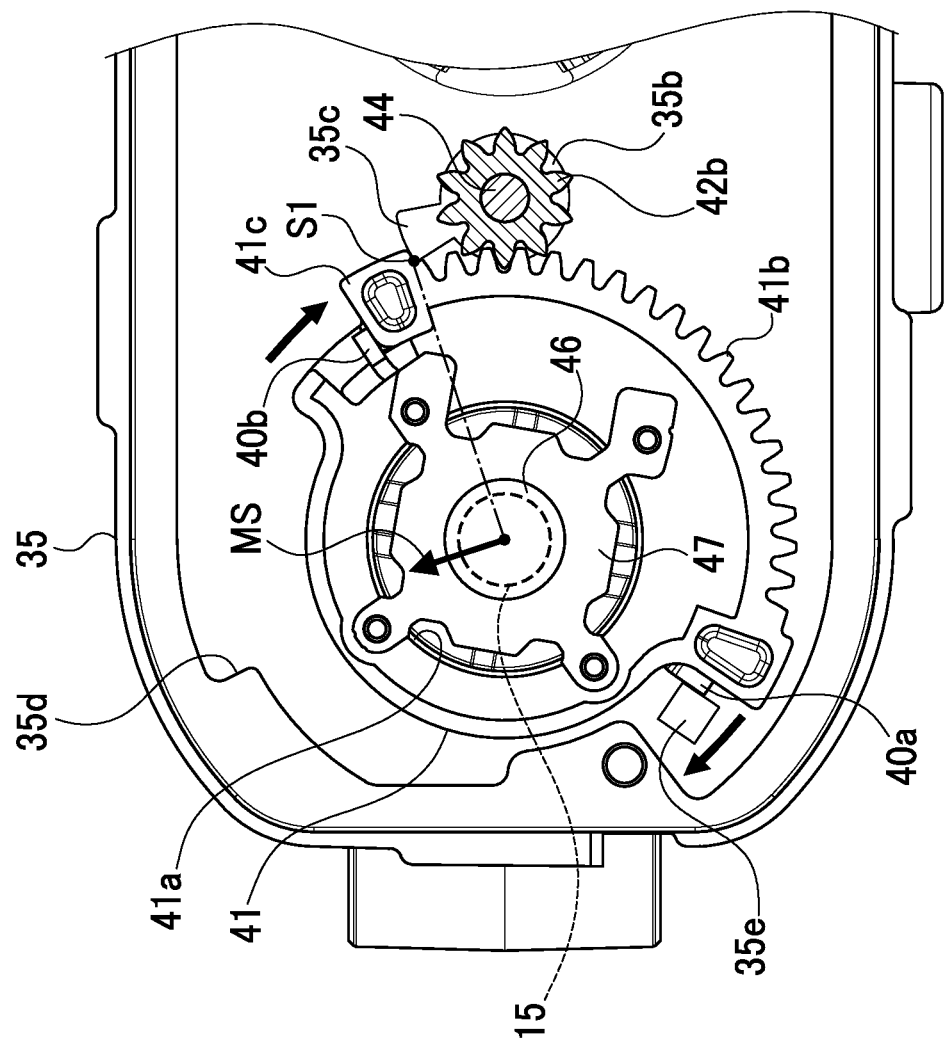
FIG. 10 is a rear view of a portion of a valve gear in FIG. 7 by partially cutting a view of an intermediate gear in the first embodiment.
Figure 11:
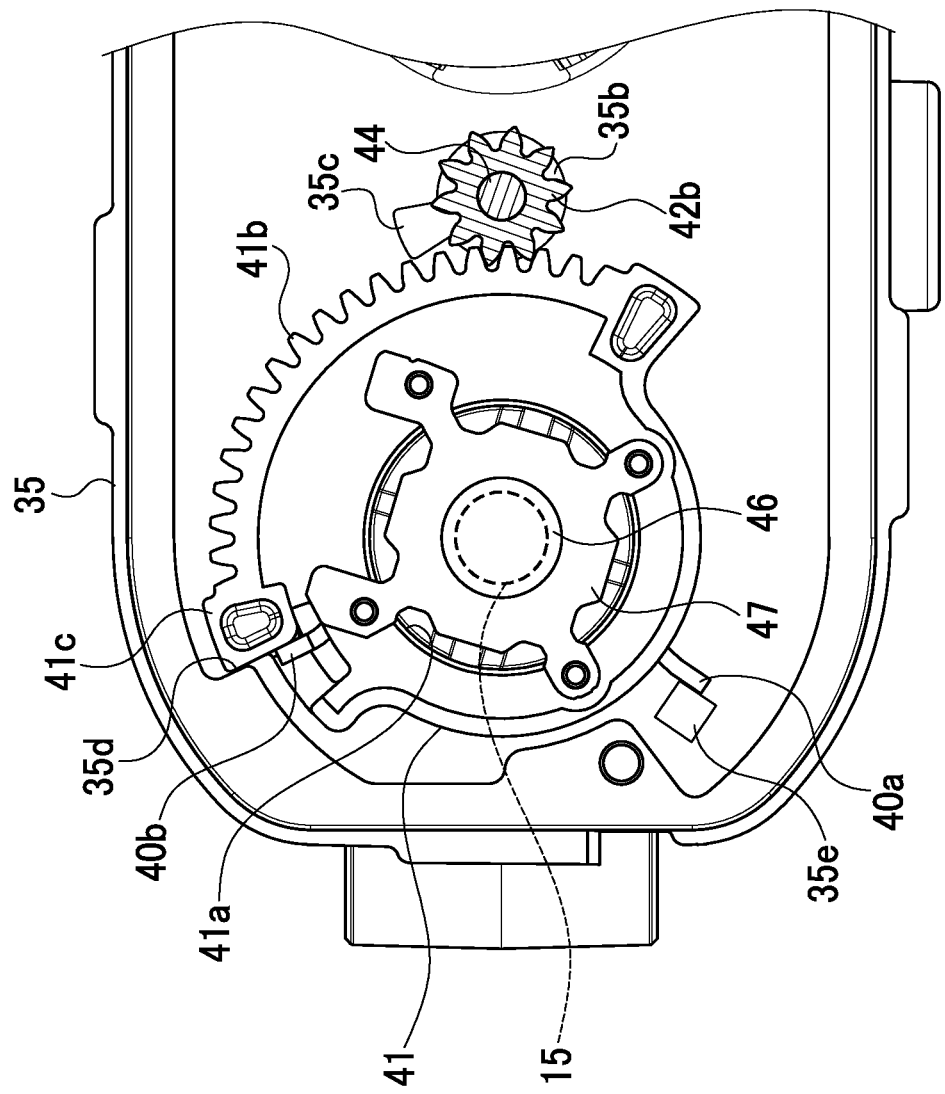
FIG. 11 is a rear view of the portion of the valve gear in FIG. 7 by partially cutting the view of the intermediate gear in the first embodiment.
Figure 12:
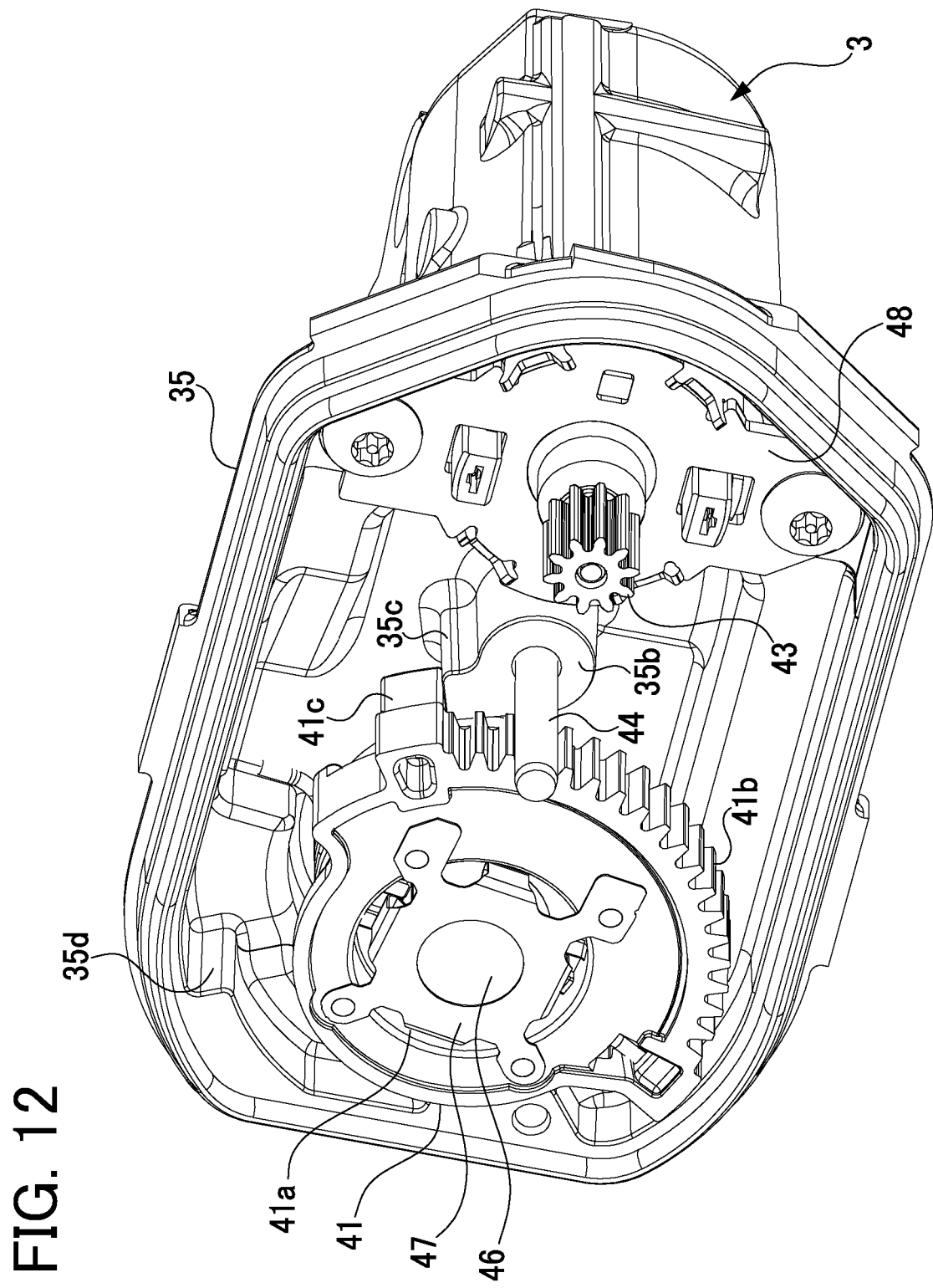
FIG. 12 is a perspective view of a rear-side of the valve housing in a state where the intermediate gear has been detached from a speed-reducing mechanism.

FIG. 8 is a side view of the valve seat 13, the valve element 14, and a part of the rotary shaft 15 in the fully-closed state. FIG. 9 is a cross-sectional view taken along a line C-C in FIG. 8 of the valve seat 13, the valve element 14, and a part of the rotary shaft 15 in the fully-closed state. FIGS. 10 and 11 each shows a rear view of a portion of the valve gear 41 in FIG. 7 by partially cutting the intermediate gear 42. FIGS. 10 and 11 each shows the valve gear 41 fixed to the proximal end portion 15*b* of the rotary shaft 15 which is seen from a side of the proximal end portion 15*b* centered about the rotary shaft 15. FIG. 10 shows a state where the valve element 14 is fully closed, and FIG. 11 shows a state where the valve element 14 is fully opened. FIG. 12 is a perspective view of a rear side of the valve housing 35 in a state where the intermediate gear 42 has been detached from the speed-reducing mechanism 33.

In FIG. 9, an axial line (a center line) of the rotary shaft 15 is represented as a main axis L1, and this main axis L1 extends in parallel to a radial direction of the valve element 14 and the valve hole 16. The main axis L1 is positioned eccentrically from a center P1 of the valve hole 16 (an axis L3 of the valve hole 16) to a radial direction of the valve hole 16 and the valve element 14, and the sealing surface 18 of the valve element 14 is positioned eccentrically from the main axis L1 to a direction where an axis L4 of the valve element 14 extends. Further, the valve element 14 is configured to rotate about the main axis L1 of the rotary shaft 15 such that the sealing surface 18 of valve element 14 is rotated between a fully-closed position (see FIG. 3) where the sealing surface 18 contacts with the seat surface 17 of the valve seat 13 and a fully-open position (see FIG. 4) where the sealing surface 18 is furthest away from the seat surface 17.

In FIG. 9, when the valve element 14 starts to rotate in a valve-opening direction (a direction indicated with an arrow F1 in FIG. 9, i.e., in a clockwise direction) from the fully-closed position, the sealing surface 18 of the valve element 14 starts to separate away from the seat surface 17 of the valve seat 13 and starts to move along a rotation track about the main axis L1 of the rotary shaft 15.

As shown in FIGS. 8 and 9, the valve element 14 includes a protrusion 14*b* protruding from a plate surface 14*a*. The protrusion 14*b* is formed with a pin hole 14*c*. The protrusion 14*b* is fixed to the rotary shaft 15 by press-fitting the pin portion 15*a* to the pin hole 14*c*. Further, a part of the rotary shaft 15 is formed with a cutout 15*c* to avoid interference with the valve element 14 in a state where the pin portion 15*a* is attached to the protrusion 14*b*. As shown in FIG. 9, the protrusion 14*b* is placed on the axis L4 of the valve element 14, and the valve element 14 including the protrusion 14*b* is formed in a two-fold rotational symmetry centered about the axis L4 of the valve element 14.

(Valve-Closing Return Mechanism)

The valve-closing return mechanism 34, namely, a relation among the rotary shaft 15, the valve gear 41, the return spring 40, and the valve housing 35 is now explained in detail. As shown in FIGS. 5 and 6, the valve gear 41 is fixed to the proximal end portion 15*b* of the rotary shaft 15. The return spring 40 is provided between the valve housing 35 and the valve gear 41 to generate the spring force. This spring force is a force to rotate the valve gear 41 and the rotary shaft 15, specifically a force to urge the valve element 14 to be seated on the valve seat 13 in the valve-closing direction.

As shown in FIGS. 10 to 12, the valve gear 41 is constituted of a fan-shaped gear and is provided with a teeth part 41*b* including a plurality of teeth formed on a part of an outer periphery, an open/close abutment portion 41*c* of a columnar shape, and a spring guide portion 41*d* (see FIGS. 5 and 6). The open/close abutment portion 41*c* extends in an axial direction of the valve gear 41 from one end in a longitudinal direction of the teeth part 41*b* (in FIGS. 10 and 11, a rear end in a clockwise direction of the teeth part 41*b*). In the valve housing 35, on the other hand, a boss 35*b* is formed to support a pin shaft 44 of the intermediate gear 42. On an outer periphery of this boss 35*b*, a full-close stopper 35*c* protruding upward in FIGS. 10 to 12 is formed. This full-close stopper 35*c* is set to abut on one side portion of the open/close abutment portion 41*c* when the valve gear 41 is positioned in a fully-closed rotation position corresponding to the fully-closed position of the valve element 14 as shown in FIG. 10. Further, the valve housing 35 is provided with a full-open stopper 35*d* on a rotation track of the open/close abutment portion 41*c*. This full-open stopper 35*d* is formed by bending a part of a rib of the valve housing 35. As shown in FIG. 11, the full-open stopper 35*d* is set to abut on the other side portion of the open/close abutment portion 41*c* when the valve gear 41 is positioned in a fully-open rotation position corresponding to the fully-open position of the valve element 14.

Figure 13:
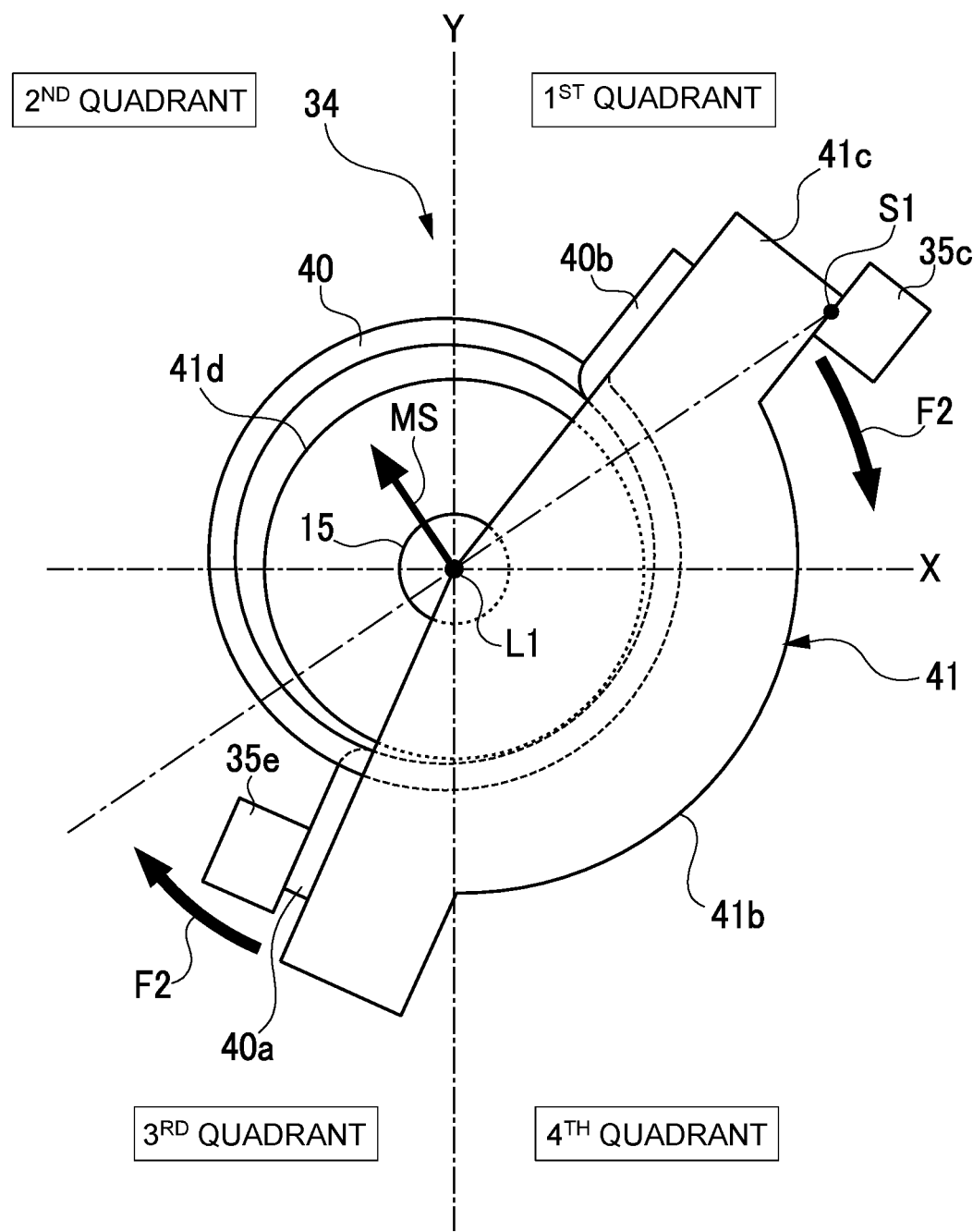
FIG. 13 is a diagram showing a relation of the rotary shaft, the valve gear, a return spring, and others shown in FIG. 10 as main components of a valve-closing return mechanism in the first embodiment.

FIG. 13 is a diagram showing a main part of the valve-closing return mechanism 34, specifically illustrating a relation among the rotary shaft 15, the valve gear 41, the return spring 40, and others shown in FIG. 10. FIG. 13 shows a state where the valve element 14 is positioned in the fully-closed position, specifically showing a state where the valve gear 41 fixed to the proximal end portion 15b of the rotary shaft 15 is seen from a side of the proximal end portion 15b centering about the rotary shaft 15. The return spring 40 is an elastic body formed of a wire member wound into a coil-like shape and has both ends with a first hook 40a and a second hook 40b, respectively. The first hook 40a and the second hook 40b are spaced apart from each other by about 180 degrees in a circumferential direction of the return spring 40. The spring guide portion 41d is placed inside the return spring 40 to support the return spring 40. The spring guide portion 41d is integrally formed with the rotary shaft 15 to internally hold the proximal end portion 15b of the rotary shaft 15. The first hook 40a of the return spring 40 is positioned on a leading-end side of the spring guide portion 41d on a rear side (a rear side in a paper of FIG. 13) of the valve housing 35 to be engaged with an engagement part 35e formed in the valve housing 35. On the other hand, the second hook 40b is positioned on a proximal-end side of the spring guide portion 41d on a side of the teeth part 41b (a front side in a paper of FIG. 13) of the valve gear 41 to be engaged with the open/close abutment portion 41c. The open/close abutment portion 41c is made to be subjected to the spring force of the return spring 40 via the second hook 40b.

In a state shown in FIG. 13, when an orthogonal coordinate system is assumed with the main axis L1 of the rotary shaft 15 as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis. In this state, the valve seat 13 and the valve element 14 (omitted their illustration) are placed in "the third quadrant and the fourth quadrant", a contact point (a fulcrum S1) of a part (the open/close abutment portion 41c) of the valve gear 41 with the full-close stopper 35c is placed in "the first quadrant", and thereby the spring force is applied to rotate the valve gear 41 in a clockwise direction (a direction indicated with an arrow F2).

Accordingly, as shown in FIGS. 10 and 13, in a state where the valve gear 41 is placed in the fully-closed rotation position, the valve gear 41 is urged to rotate in the direction indicated with the arrow F2 in FIG. 13 centering about the rotary shaft 15 by the spring force of the return spring 40, and then the open/close abutment portion 41c comes to contact with the full-close stopper 35c to stop rotation of the valve gear 41. At this time, as shown in FIG. 13, the rotary shaft 15 is subjected to spring moment MS that is applied to the valve gear 41 with the contact point of the open/close abutment portion 41c and the full-close stopper 35c as the fulcrum S1.

Figure 14:
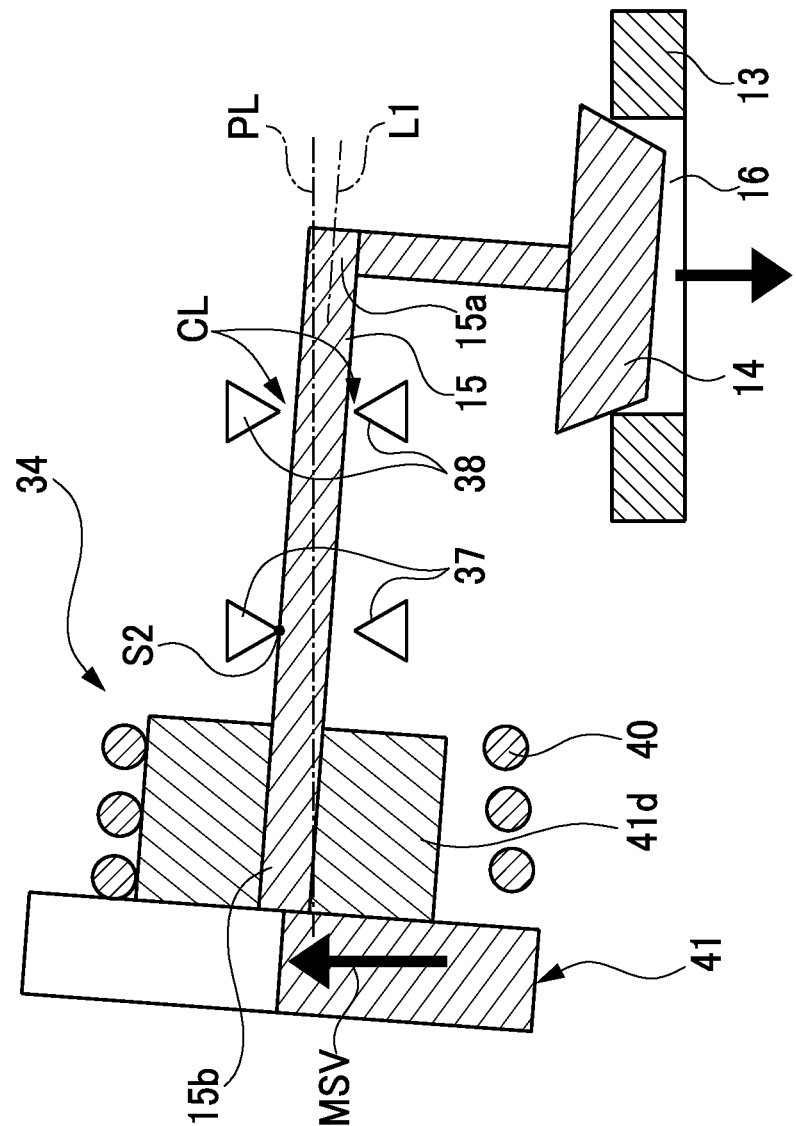
FIG. 14 is a schematic view of the main components of the valve-closing return mechanism when seen from another angle in the first embodiment.
Figure 15:
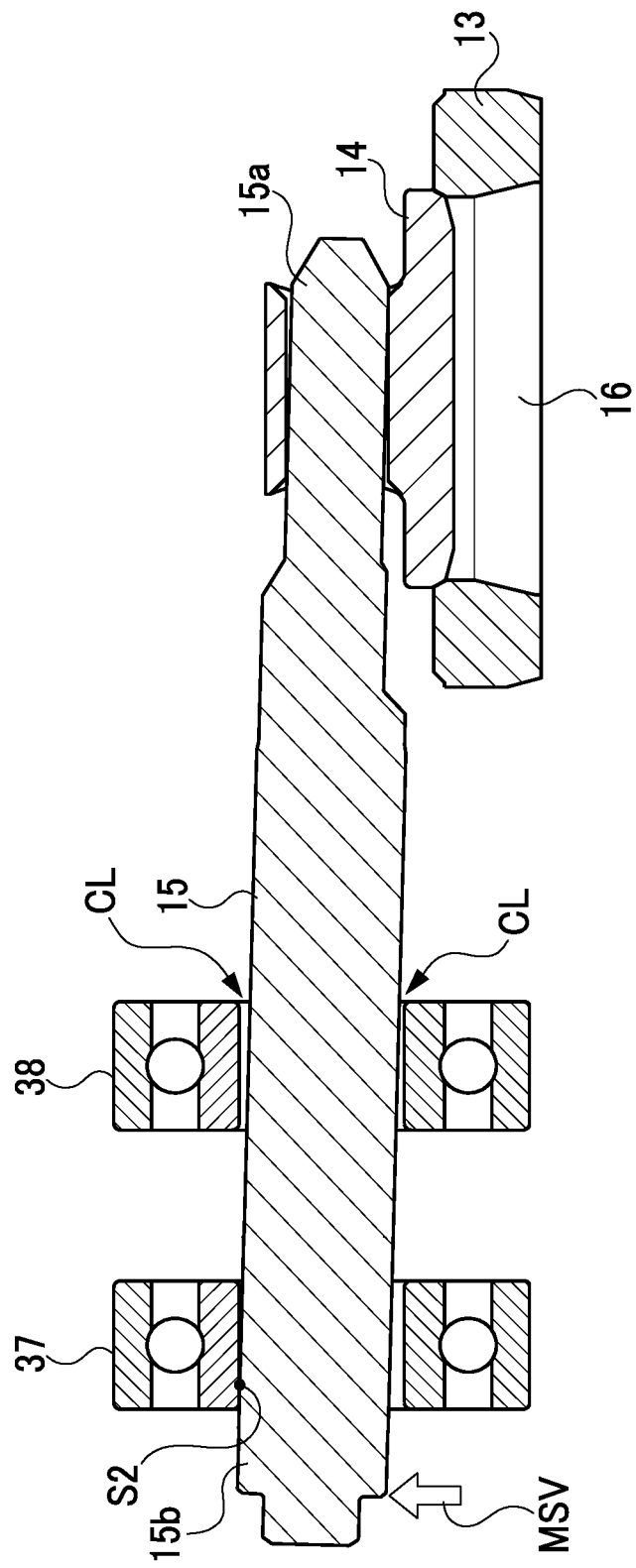
FIG. 15 is a sectional side view showing a relation of the tilted rotary shaft, both bearings, the valve element, and the valve seat in the first embodiment.

FIG. 14 is a schematic view of the main part of the valve-closing return mechanism 34 when seen from another angle. FIG. 15 is a side sectional view showing a relation among the tilted rotary shaft 15, both the bearings 37 and 38, the valve element 14, and the valve seat 13. As shown in FIG. 14, in the fully-closed state where the valve element 14 is seated on the valve seat 13, the spring moment MS subjected to the valve gear 41 acts on the proximal end portion 15b of the rotary shaft 15, so that a push-up force MSV as a vertical component of the spring moment MS acts on the proximal end portion 15b. In this state, an outer periphery of the proximal end portion 15b of the rotary shaft 15 is set to be pressed against an inner periphery of the first bearing 37 such that the rotary shaft 15 is tilted toward the valve seat 13 in a direction of the main axis L1 with keeping a minute clearance CL from the second bearing 38 at the contact point with the first bearing 37 as a fulcrum S2 to press the valve element 14 against the valve seat 13. In FIG. 14, "PL" represents the horizontal line and the main axis L1 of the rotary shaft 15 is tilted relative to the horizontal line PL.

As explained above, according to the configuration of the EGR valve 1 of the present embodiment, in the fully-closed state where the valve element 1 is placed in the fully-closed position, energization of the motor 32 generates the drive force transmitted to the valve gear 41 through the speed-reducing mechanism 33. Thereby, the valve gear 41 is rotated with the rotary shaft 15 against the spring force of the return spring 40, and thus the valve element 14 is rotated in the valve-opening direction. To be specific, the sealing surface 18 of the valve element 14 is separated away from the seat surface 17 of the valve seat 13 to open the passage 11. An open degree (an EGR open degree) of the valve element 14 at this time is determined by a rotation angle of the rotary shaft 15 and the valve gear 41. When the valve element 14 is in the fully-open state, as shown in FIG. 11, the open/close abutment portion 41c of the valve gear 41 comes to contact with the full-open stopper 35d, and thus rotation of the valve gear 41 is restricted. At this time, even if the drive force of the motor 32 is supplied to the valve gear 41, further valve-opening of the valve element 14 is restricted and the valve element 14 is maintained its fully-open state.

On the other hand, when the rotary shaft 15 is reversely rotated with the valve gear 41 by the motor 32 from the fully-open state of the valve element 14, the valve element 14 is rotated in the valve-closing direction. At this time, the spring force of the return spring 40 acts in a direction to reversely rotate the valve gear 41, and thereby the valve element 14 is rotated swiftly in the valve-closing direction. When the valve element 14 is in the fully-closed state where the valve element 14 is seated on the valve seat 13, the sealing surface 18 of the valve element 14 comes to contact with the seat surface 17 of the valve seat 13 to shut off the passage 11. At this time, as shown in FIG. 10, the open/close abutment portion 41c of the valve gear 41 comes to contact with the full-close stopper 35c to restrict its rotation. Further, even if the drive force of the motor 32 is kept applied to the valve gear 41, further rotation of the valve element 14 is restricted to maintain the fully-closed state of the valve element 14.

After that, when energization to the motor 32 is halted in the fully-closed state of the valve element 14 to stop driving the motor 32 (non-driving) and stop supplying the drive force to the valve gear 41, the valve gear 41 is only subjected to the spring force of the return spring 40 in a direction to close the valve element 14. At this time, as shown in FIGS. 10 and 13, the valve gear 41 is subjected to the spring moment MS with the contact point of the open/close abutment portion 41c of the valve gear 41 and the full-close stopper 35c as the fulcrum S1, and the push-up force MSV exerted by this moment MS acts on the proximal end portion 15b of the rotary shaft 15. Thereby, as shown in FIGS. 14 and 15, the rotary shaft 15 is tilted toward the valve seat 13 in a direction of the main axis L1 at the contact point with the first bearing as the fulcrum S2 while keeping the minute clearance CL with the second bearing 38 so that the valve element 14 is pressed against the valve seat 13. Therefore, even during non-driving of the motor 32, the valve element 14 is pressed against the valve seat 13, and thus both the valve element 14 and the valve seat 13 can be kept sealed. As a result of this, when the EGR valve 1 is used for an EGR apparatus of an engine, for example, sealing between the valve element 14 and the valve seat 13 can be kept during non-driving of the motor 32, thereby preventing foreign matters from getting stuck between the valve element 14 and the valve seat 13. Further, sealing performance between the valve seat 13 and the valve element 14, namely between the seat surface 17 and the sealing surface 18 can be improved. At this time, the minute clearance CL is kept between the inner periphery of the second bearing 38 and the outer periphery of the rotary shaft 15, and thus the rotary shaft 15 and the second bearing 38 are not strictly in contact with each other, so that the valve element 14 is subjected to the maximum force to tilt the rotary shaft 15. Therefore, the valve element 14 and the valve seat 13 can be sealed by the maximum force.

According to the configuration of the present embodiment, in FIG. 13, the valve seat 13 and the valve element 14 are placed in the third quadrant and the fourth quadrant and the contact point (the fulcrum S1) of the open/close abutment portion 41c of the valve gear 41 and the full-close stopper 35c is placed in the first quadrant such that the spring force acts in a direction to rotate the valve gear 41 in the clockwise direction. Accordingly, from a positional relation of the valve seat 13, the valve element 14, and the contact point (the fulcrum S1) of the open/close abutment portion 41c of the valve gear 41 and the full-close stopper 35c, the force exerted by the spring moment MS to tilt the rotary shaft 15 toward the valve seat 13 in the direction of the main axis L1 of the rotary shaft 15 effectively acts on the valve element 14. Therefore, the valve element 14 can be effectively pressed against the valve seat 13.

Further, according to the configuration of the present embodiment, in the passage 11 where the valve seat 13 and the valve element 14 are placed, the valve element 14 is placed upstream of the valve seat 13 on an upstream side of the EGR gas flow, and thus the pressure of the EGR gas is applied in a direction of pressing the valve element 14 against the valve seat 13 in the fully-closed state. Therefore, under an operation state of the engine, when the EGR valve 1 is fully closed, the sealing performance between the valve seat 13 and the valve element 14, namely between the seat surface 17 and the sealing surface 18 is further improved.

Second Embodiment

A second embodiment embodying a double eccentric valve to an EGR valve is now explained
in detail with reference to the accompanying drawings.
In the following explanation, similar or identical constituent components to those of the first embodiment are
assigned with the same reference signs as those in the first embodiment and their explanation are omitted, and the following explanation is made with focus on the differences from the first embodiment.

In the present embodiment, arrangement of the valve section 2 and the motor section 3 relative to the speed-reducing mechanism section 4 shown in FIG. 1 is switched to each other, and correspondingly, arrangement of the rotary shaft 15 and the valve gear 41 and arrangement of the return spring 40 and the motor gear 43 are switched to each other from the state shown in FIG. 7. Those are different from the configuration of the EGR valve 1 in the first embodiment.

Figure 16:
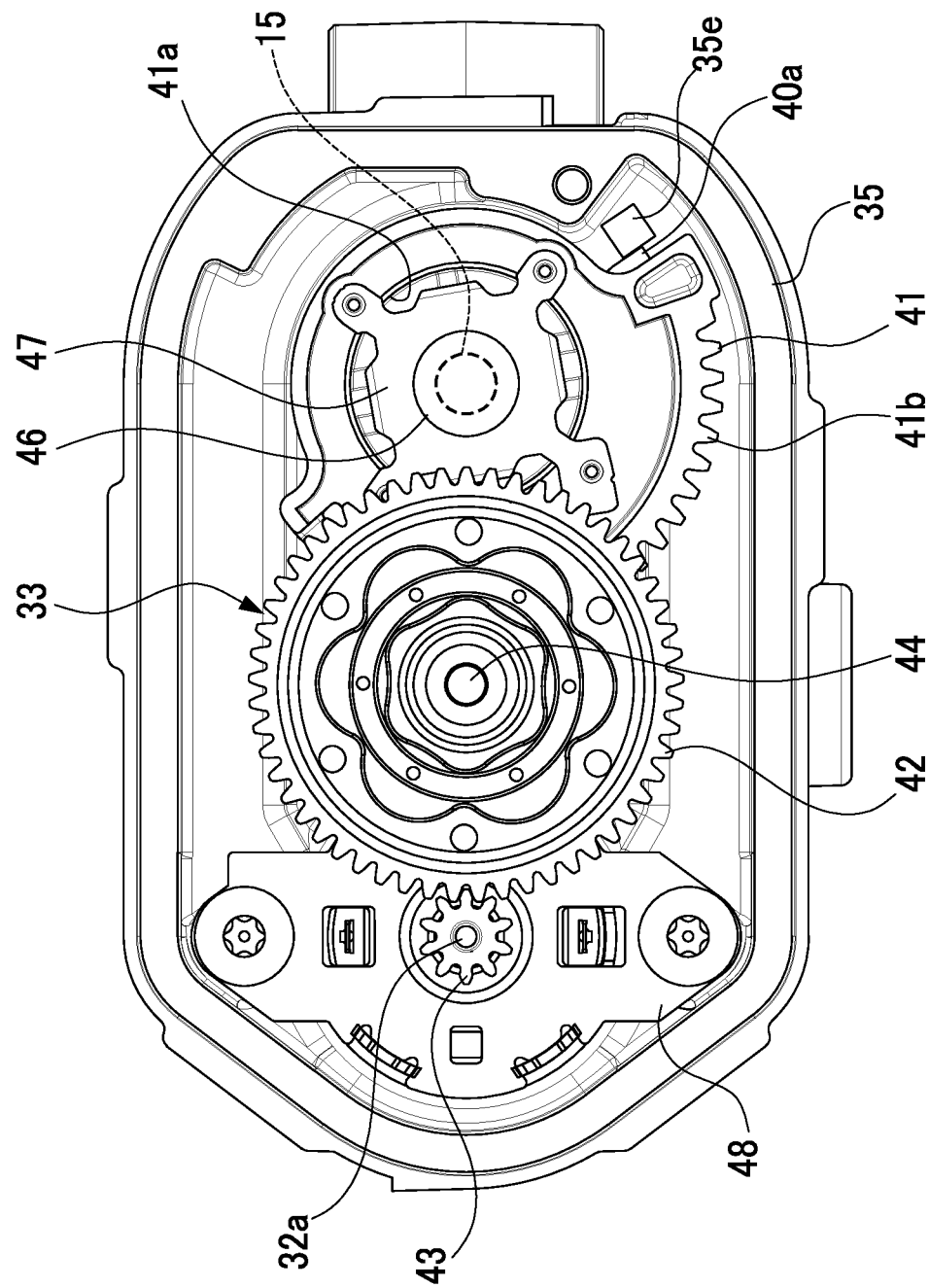
FIG. 16 is a rear view corresponding to FIG. 7, showing a state where the end frame has been detached from the valve housing of the EGR valve in the fully-closed state in a second embodiment.
Figure 17:
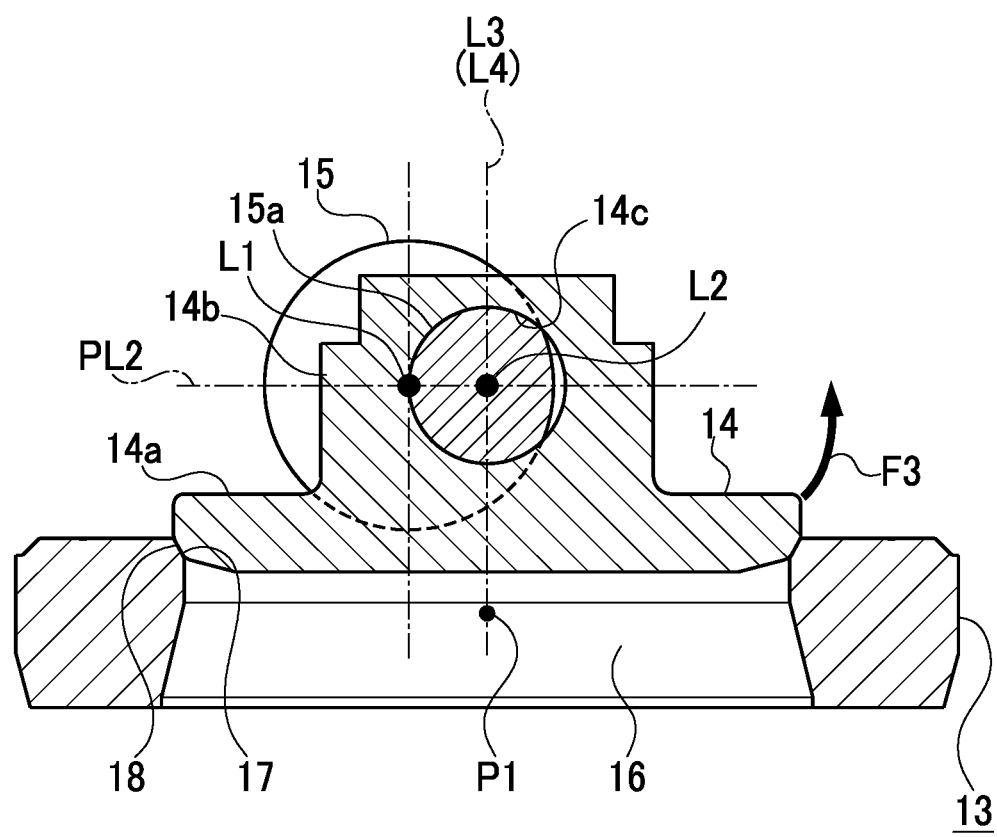
FIG. 17 is a cross-sectional view corresponding to FIG. 9, showing the valve seat, the valve element, and a part of the rotary shaft in the fully-closed state in the second embodiment.
Figure 18:
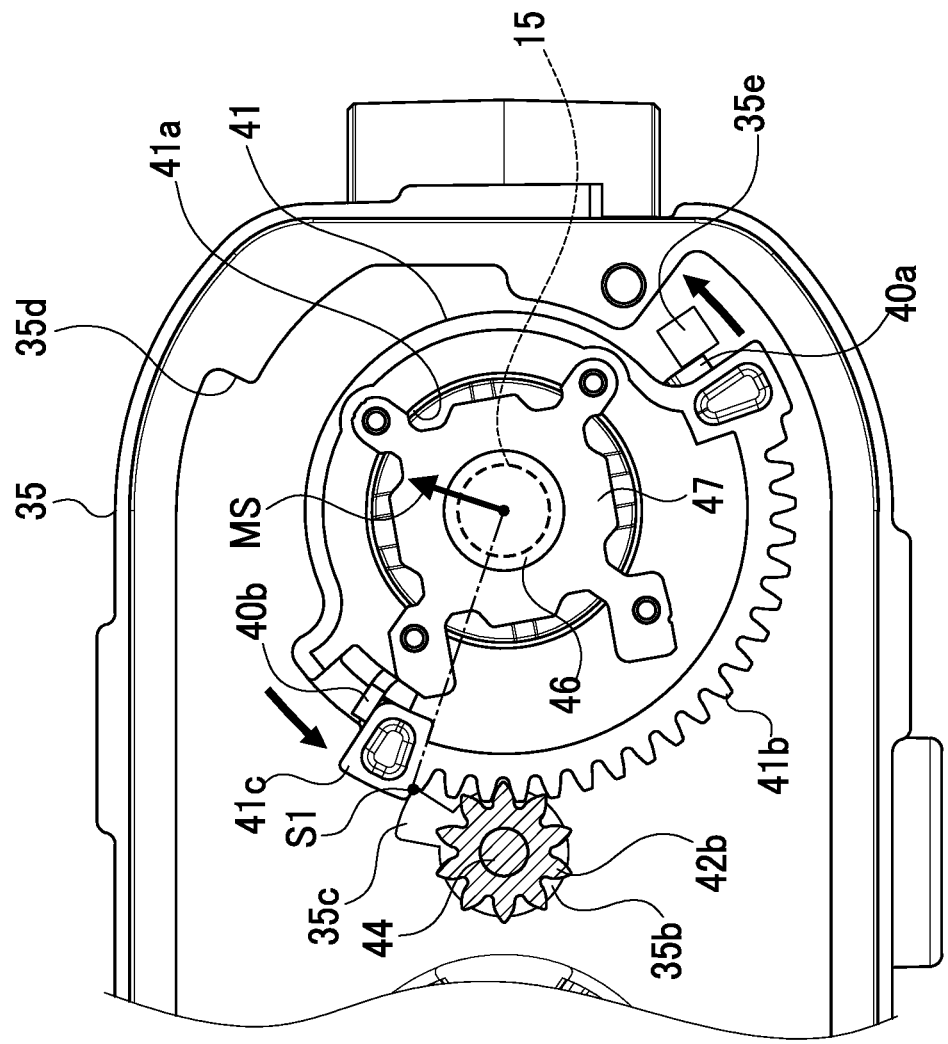
FIG. 18 is a rear view corresponding to FIG. 10, showing a portion of the valve gear in FIG. 16 by partially cutting a view of the intermediate gear in the second embodiment.
Figure 19:
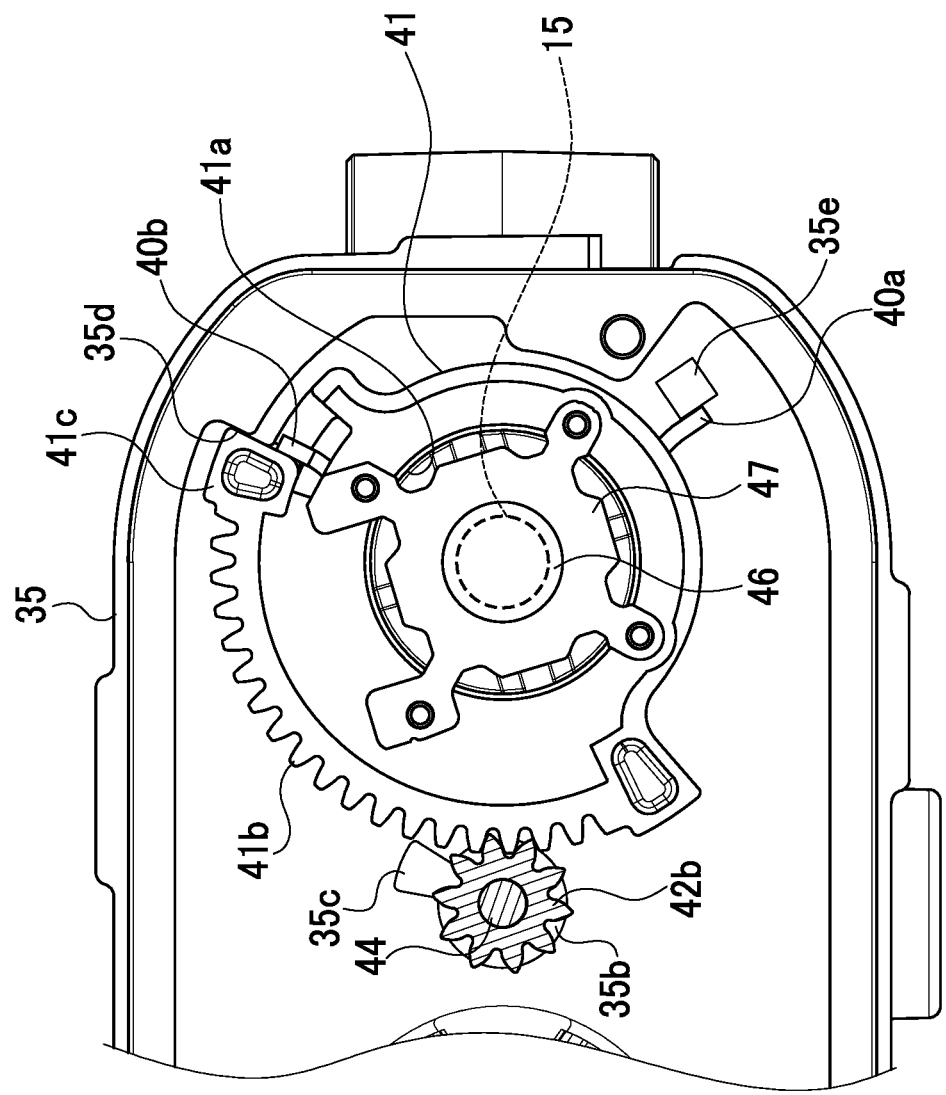
FIG. 19 is a rear view corresponding to FIG. 11, showing a portion of the valve gear in FIG. 16 by partially cutting a view of the intermediate gear in the second embodiment.
Figure 20:
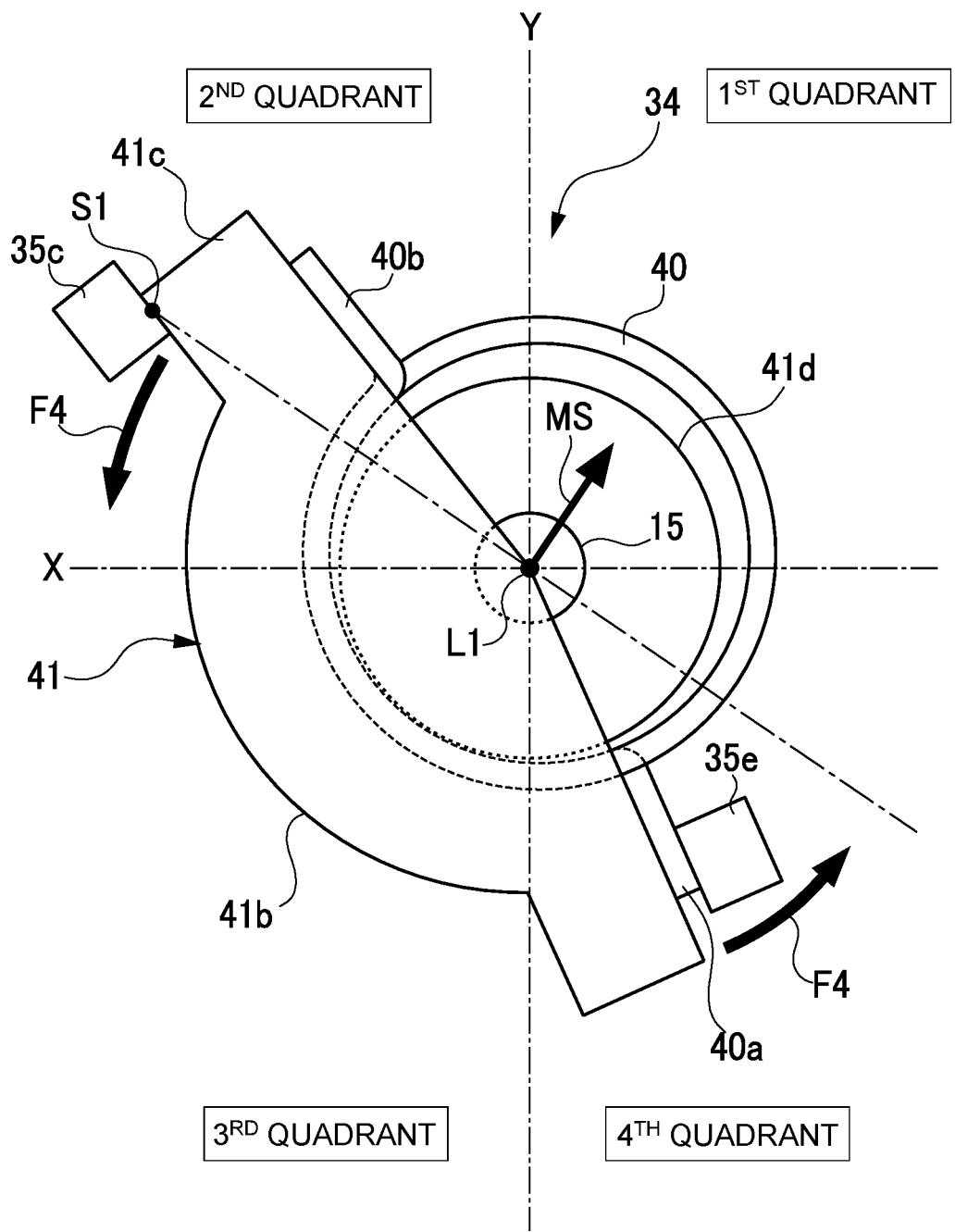
FIG. 20 is a diagram corresponding to FIG. 13, showing a relation of the rotary shaft, the valve gear, the return spring, and others shown in FIG. 18 as the main components of the valve-closing return mechanism in the second embodiment.

FIG. 16 shows a state corresponding to FIG. 7 where the end frame 36 has been detached from the valve housing 35 in the fully-closed EGR valve 1. FIG. 17 is a sectional view corresponding to FIG. 9, showing the valve seat 13, the valve element 14, and a part of the rotary shaft 15 in the fully-closed state. FIG. 18 is a rear view corresponding to FIG. 10 of a portion of the valve gear 41 in FIG. 16 by partially cutting the intermediate gear 42. FIG. 19 is a rear view corresponding to FIG. 11 of a portion of the valve gear 41 in FIG. 16 by partially cutting the intermediate gear 42. FIG. 20 is a diagram corresponding to FIG. 13 illustrating a relation of the rotary shaft 15, the valve gear 41, the return spring 40, and others shown in FIG. 18.

In the present embodiment, as shown in FIG. 16, the motor gear 43 is located on a left side and the valve gear 41 is located on a right side centering about the intermediate gear 42, and these gears 41 to 43 are meshed and drivingly coupled to one another. Thereby, when the valve gear 41 is normally rotated, the valve gear 41 is made to rotate with the rotary shaft 15 in a counter-clockwise direction in FIG. 16. In association with this rotation, in FIG. 17, the valve element 14 is made to be rotated in the counter-clockwise direction and opened as indicated with an arrow F3. In association with this valve opening, as shown in FIGS. 18 and 19, the open/close abutment portion 41c of the valve gear 41 and the full-close stopper 35c are positioned on the left side of the rotary shaft 15 (in an opposite positional relationship from the positional relationship of the open/close abutment portion 41c and the full-close stopper 35c in FIGS. 10 and 11).

Further, in a state shown in FIG. 20, when an orthogonal coordinate system is assumed with the main axis L1 of the rotary shaft 15 as the origin, the X axis as the horizontal direction, and the Y axis as the vertical direction, the first quadrant is a part defined by the +X axis and the +Y axis, the second quadrant is a part defined by the −X axis and the +Y axis, the third quadrant is a part defined by the −X axis and the −Y axis, and the fourth quadrant is a part defined by the +X axis and the −Y axis. At this time, the valve seat 13 and the valve element 14 (not shown) are placed in "the third quadrant and the fourth quadrant" and the contact point (the fulcrum S1) of the part (the open/close abutment portion 41c) of the valve gear 41 and the full-close stopper 35c is placed in "the second quadrant" such that the spring force acts on the valve gear 41 to rotate in a counter-clockwise direction (in a direction indicated with an arrow F4).

Accordingly, as shown in FIGS. 18 and 20, in a state where the valve gear 41 is placed in the fully-closed rotational position, the valve gear 41 is urged to rotate in the direction (in the counter-clockwise direction) indicated with the arrow F4 in FIG. 20 centering about the rotary shaft 15 by the spring force of the return spring 40, and then rotation of the valve gear 41 is halted by the contact of the open/close abutment portion 41c with the full-close stopper 35c. At this time, as shown in FIG. 20, the rotary shaft 15 is subjected to the spring moment MS acting on the valve gear 41 at the contact point of the open/close abutment portion 41c with the full-close stopper 35c as the fulcrum S1.

According to the above-mentioned configuration of the EGR valve 1 of the present embodiment, unlike the first embodiment, the positional relationship of the main constituent components in the valve housing 35 is opposite to that of the first embodiment. The contact point (the fulcrum S1) of the open/close abutment portion 41c of the valve gear 41 and the full-close stopper 35c is located in "the second quadrant" in FIG. 20, and the valve gear 41 is subjected to the spring force to be rotated in the counter-clockwise direction, but the similar operations and effects to the first embodiment can be obtained.

The present disclosed technique is not limited to each of the above embodiments and may be embodied with partial modifications without departing from the scope of the subject matter of the disclosed technique.

Figure 21:
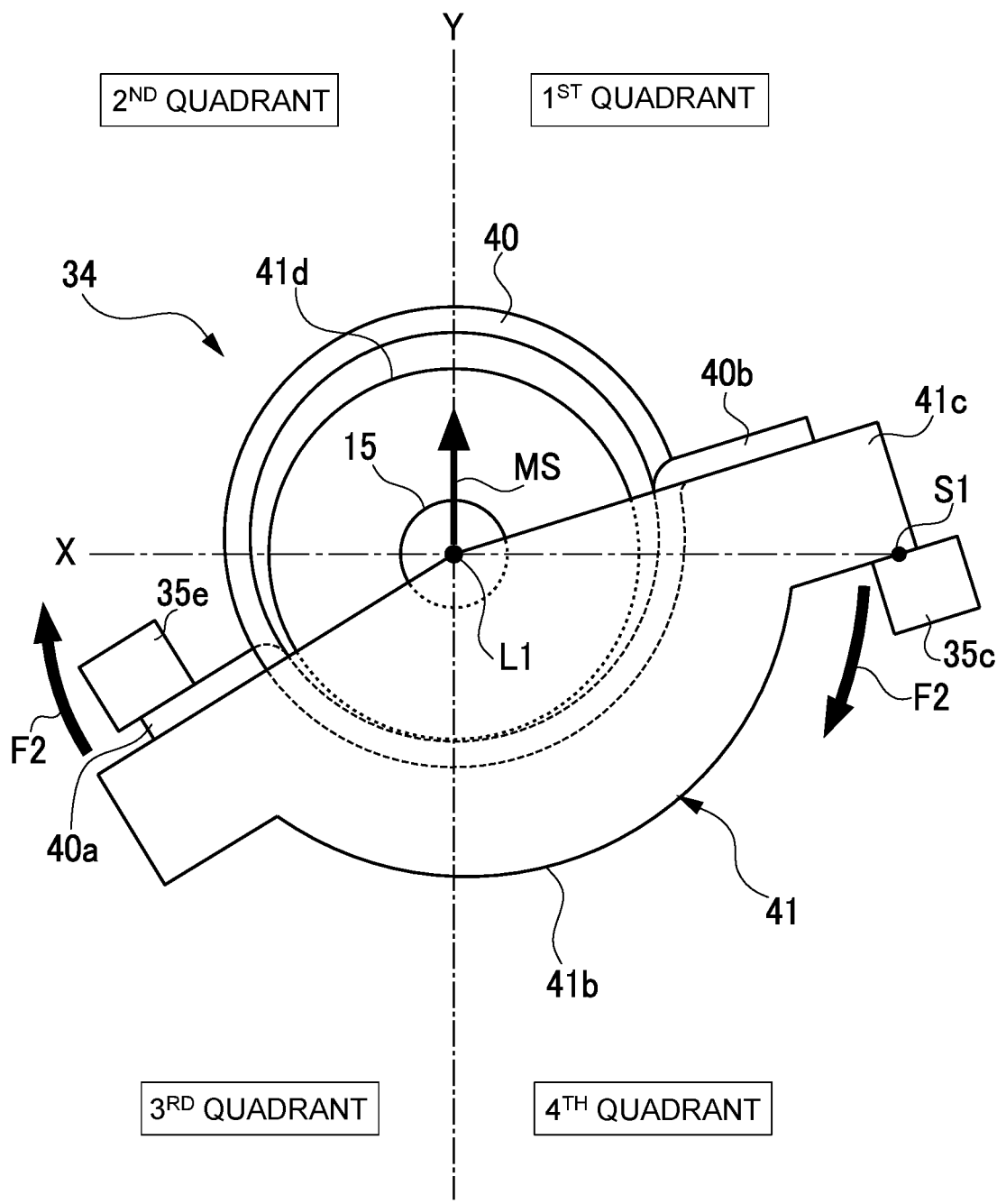
FIG. 21 is a diagram corresponding to FIG. 13, showing a relation of the rotary shaft, the valve gear, the return spring, and others in another embodiment.

(1) In the above first embodiment, in FIG. 13, the valve seat 13 and the valve element 14 (both are omitted their illustration) are placed in the third quadrant and the fourth quadrant, and the contact point (the fulcrum S1) of the open/close abutment portion 41c of the valve gear 41 and the full-close stopper 35c is placed in the first quadrant such that the spring force acts on the valve gear 41 to be rotated in the clockwise direction. Alternatively, as shown in FIG. 21, the valve seat 13 and the valve element 14 (both not shown) may be placed in the third quadrant and the fourth quadrant, and the contact point (the fulcrum S1) of the open/close abutment portion 41c of the valve gear 41 and the full-close stopper 35c may be placed on a boundary of the first quadrant and the fourth quadrant such that the spring force acts on the valve gear 41 to be rotated in the clockwise direction. In this example, as shown in FIG. 21, the spring moment MS itself acts in the vertical direction with respect to the main axis L1 of the rotary shaft 15, and thus the valve element 14 can be most effectively pressed against the valve seat 13.

(2) In the above first embodiment, in FIG. 13, the valve seat 13 and the valve element 14 (both not shown) are placed in the third quadrant and the fourth quadrant, and the contact point (the fulcrum S1) of the open/close abutment portion 41c of the valve gear 41 and the full-close stopper 35c is placed in the first quadrant such that the spring force acts on the valve gear 41 to be rotated in the clockwise direction. Alternatively, the valve seat and the valve element may be placed in the third quadrant and the fourth quadrant, and the contact point (the fulcrum S1) of the open/close abutment portion of the valve gear and the full-close stopper may be placed in the fourth quadrant such that the spring force acts on the valve gear to be rotated in the clockwise direction.

(3) In the above second embodiment, in FIG. 20, the valve seat 13 and the valve element 14 (both not shown) are placed in the third quadrant and the fourth quadrant, and the contact point (the fulcrum S1) of the open/close abutment portion 41c of the valve gear 41 and the full-close stopper 35c is placed in the second quadrant such that the spring force acts on the valve gear 41 to be rotated in the counter-clockwise direction. Alternatively, the valve seat and the valve element may be placed in the third quadrant and the fourth quadrant, and the contact point (the fulcrum S1) of the open/close abutment portion of the valve gear and the full-close stopper is placed on a boundary of the second quadrant and the third quadrant such that the spring force acts on the valve gear to be rotated in the counter-clockwise direction. In this case, the spring moment itself acts in the vertical direction with respect to the main axis of the rotary shaft, and thus the valve element can be most effectively pressed against the valve seat.

(4) In the above second embodiment, in FIG. 20, the valve seat 13 and the valve element 14 (both not shown) are placed in the third quadrant and the fourth quadrant, and the contact point (the fulcrum S1) of the open/close abutment portion 41c of the valve gear 41 and the full-close stopper 35c is placed in the second quadrant such that the spring force acts on the valve gear 41 to be rotated in the counter-clockwise direction. Alternatively, the valve seat and the valve element may be placed in the third quadrant and the fourth quadrant, and the contact point (the fulcrum S1) of the open/close abutment portion of the valve gear and the full-close stopper may be placed in the third quadrant such that the spring force acts on the valve gear to be rotated in the counter-clockwise direction.

(5) In each of the above embodiments, a double eccentric valve of this disclosed technique is embodied as the EGR valve 1, but the valve is not limited to an EGR valve but may be any one of electrically-operated flow rate regulation valves for regulating a flow rate of a fluid.

INDUSTRIAL APPLICABILITY

This disclosed technique may be utilized for a flow rate regulation valve regulating a flow rate of a fluid such as exhaust gas.

REFERENCE SIGNS LIST

1 EGR valve
13 Valve seat
14 Valve element
15 Rotary shaft
15a Pin portion (Leading end portion)
15b Proximal end portion
16 Valve hole
17 Seat surface
18 Sealing surface
32 Motor (Drive source)
34 Valve-closing return mechanism
35 Valve housing
35c Full-close stopper
37 First bearing
38 Second bearing
40 Return spring
41 Valve gear
41c Open/close abutment portion (A part of the valve gear)
L1 Main axis (Axial line of the rotary shaft)
L3 Axial line (of the valve hole)
L4 Axial line (of the valve element)
P1 Center
MS Spring moment
MSV Push-up force
S1 Fulcrum
S2 Fulcrum
CL Clearance

The invention claimed is:
1. A double eccentric valve comprising:
a valve seat including a valve hole and a seat surface formed on an outer periphery of the valve hole;
a valve element provided on its outer periphery with a sealing surface corresponding to the seat surface; and
a rotary shaft including a leading end portion and a proximal end portion, the leading end portion being integrally provided with the valve element to rotate the valve element, in which an axial line of the rotary shaft extends in parallel to a radial direction of the valve element and the valve hole and is placed eccentrically from a center of the valve hole to another radial direction of the valve hole, and the sealing surface is positioned eccentrically from the axial line of the rotary shaft to a direction in which an axial line of the valve element extends such that the valve element is rotated by rotation of the rotary shaft between a fully-closed position where the valve element is seated on the valve seat and a fully-open position where the valve element is furthest away from the valve seat, wherein
the double eccentric valve comprises:
a drive source to generate a drive force to rotate the rotary shaft;

a valve gear integrally provided with the proximal end portion of the rotary shaft to receive the drive force for rotating the rotary shaft;

a bearing placed on a side of the proximal end portion of the rotary shaft to rotatably support the rotary shaft with the leading end portion thereof as a free end in cantilever configuration;

a return spring to apply, to the valve gear, a spring force of rotating the rotary shaft in a direction to close the valve element; and a full-close stopper to which a part of the valve gear is contacted to restrict rotation of the valve gear with the rotary shaft while the valve element is placed in the fully-closed position, the bearing includes a first bearing and a second bearing placed on a side of the proximal end portion of the rotary shaft, the first bearing being placed in a position closer to the valve gear than the second bearing, the part of the valve gear is configured to be contacted with the full-close stopper by the spring force applied to the valve gear during non-driving of the drive source to apply the moment acting on the valve gear to the rotary shaft at the contact point of the valve gear with the full-close stopper as the fulcrum, so that the rotary shaft is tilted in its axial direction toward the valve seat to press the valve element against the valve seat with keeping a minute clearance from the second bearing at a contact point with the first bearing as the fulcrum, in a state where the valve element in the fully-closed position and where the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant and the contact point of the part of the valve gear and the full-close stopper is placed in the first quadrant or the fourth quadrant such that the spring force acts in a direction to rotate the valve gear in a clockwise direction, the valve gear is provided with a teeth part including a plurality of teeth on a part of an outer periphery, the double eccentric valve comprises an intermediate gear to transmit the drive force of the drive source to the valve gear, and the valve element is configured to rotate between the fully-closed position in the third quadrant and the fourth quadrant and the fully-open position in the first quadrant and the fourth quadrant and a contact point of a part of the teeth part of the valve gear and a part of the intermediate gear is placed in the first quadrant or the fourth quadrant during rotation of the valve element.

2. A double eccentric valve comprising:

a valve seat including a valve hole and a seat surface formed on an outer periphery of the valve hole;

a valve element provided on its outer periphery with a sealing surface corresponding to the seat surface; and a rotary shaft including a leading end portion and a proximal end portion, the leading end portion being integrally provided with the valve element to rotate the valve element, in which an axial line of the rotary shaft extends in parallel to a radial direction of the valve element and the valve hole and is placed eccentrically from a center of the valve hole to another radial direction of the valve hole, and the sealing surface is positioned eccentrically from the axial line of the rotary shaft to a direction in which the axial line of the valve element extends such that the valve element is rotated by rotation of the rotary shaft between a fully-closed position where the valve element is seated on the valve seat and a fully-open position where the valve element is furthest away from the valve seat, wherein the double eccentric valve comprises:

a drive source to generate a drive force to rotate the rotary shaft;

a valve gear integrally provided with the proximal end portion of the rotary shaft to receive the drive force for rotating the rotary shaft and provided with a teeth part including a plurality of teeth on a part of an outer periphery;

a bearing placed on a side of the proximal end portion of the rotary shaft to rotatably support the rotary shaft with the leading end portion thereof as a free end in cantilever configuration;

a return spring to apply, to the valve gear, a spring force of rotating the rotary shaft in a direction to close the valve element;

a full-close stopper to which a part of the valve gear is contacted to restrict rotation of the valve gear with the rotary shaft while the valve element is placed in the fully-closed position, and an intermediate gear to transmit the drive force of the drive source to the valve gear, the part of the valve gear is configured to be contacted to the full-close stopper by the spring force applied to the valve gear during non-driving of the drive source to apply the moment acting on the valve gear to the rotary shaft at a contact point of the valve gear with the full-close stopper as a fulcrum, so that the rotary shaft is tilted in its axial direction toward the valve seat to press the valve element against the valve seat at a contact point with the bearing as a fulcrum, a part of the teeth part of the valve gear is configured to be contacted with a part of the intermediate gear by the spring force applied to the valve gear during driving of the drive source to apply the moment acting on the valve gear to the rotary shaft at the contact point of the valve gear with the intermediate gear as the fulcrum, so that the rotary shaft is urged in a direction to be tilted in its axial direction toward the valve seat at the contact point with the bearing as the fulcrum, in a state where the valve element is placed in the fully-closed position and the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant, and a contact point of a part of the valve gear and the fully-close stopper is placed in the first quadrant or the fourth quadrant, and the valve gear is subjected to the spring force in a direction to rotate in a clockwise direction, and the valve element is configured to rotate between the fully-closed position in the third quadrant and the fourth quadrant and the fully-open position in the first quadrant and the fourth quadrant and the contact point of the part of the teeth part of the valve gear and the part of the intermediate gear is placed in the first quadrant or the fourth quadrant during rotation of the valve element.

3. A double eccentric valve comprising:

a valve seat including a valve hole and a seat surface formed on an outer periphery of the valve hole;

a valve element provided on its outer periphery with a sealing surface corresponding to the seat surface; and a rotary shaft including a leading end portion and a proximal end portion, the leading end portion being integrally provided with the valve element to rotate the valve element, in which an axial line of the rotary shaft extends in parallel to a radial direction of the valve element and the valve hole and is placed eccentrically from a center of the valve hole to another radial direction of the valve hole, and the sealing surface is positioned eccentrically from the axial line of the rotary shaft to a direction in which an axial line of the valve element extends such that the valve element is rotated by rotation of the rotary shaft between a fully-closed position where the valve element is seated on the valve seat and a fully-open position where the valve element is furthest away from the valve seat, wherein the double eccentric valve comprises:

a drive source to generate a drive force to rotate the rotary shaft;

a valve gear integrally provided with the proximal end portion of the rotary shaft to receive the drive force for rotating the rotary shaft;

a bearing placed on a side of the proximal end portion of the rotary shaft to rotatably support the rotary shaft with the leading end portion thereof as a free end in cantilever configuration;

a return spring to apply, to the valve gear, a spring force of rotating the rotary shaft in a direction to close the valve element; and a full-close stopper to which a part of the valve gear is contacted to restrict rotation of the valve gear with the rotary shaft while the valve element is placed in the fully-closed position, the bearing includes a first bearing and a second bearing placed on a side of the proximal end portion of the rotary shaft, the first bearing being placed in a position closer to the valve gear than the second bearing, the part of the valve gear is configured to be contacted with the full-close stopper by the spring force applied to the valve gear during non-driving of the drive source to apply the moment acting on the valve gear to the rotary shaft at the contact point of the valve gear with the full-close stopper as the fulcrum, so that the rotary shaft is tilted in its axial direction toward the valve seat to press the valve element against the valve seat with keeping a minute clearance from the second bearing at a contact point with the first bearing as the fulcrum, in a state where the valve element in the fully-closed position and where the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant and the contact point of the part of the valve gear with the full-close stopper is placed in the second quadrant or the third quadrant such that the spring force acts in a direction to rotate the valve gear in a counter-clockwise direction, the valve gear is provided with a teeth part including a plurality of teeth on a part of an outer periphery, the double eccentric valve comprises an intermediate gear to transmit the drive force of the drive source to the valve gear, and the valve element is configured to rotate between the fully-closed position in the third quadrant and the fourth quadrant and the fully-open position in the second quadrant and the third quadrant and a contact point of a part of the teeth part of the valve gear and a part of the intermediate gear is placed in the second quadrant or the third quadrant during rotation of the valve element.

4. A double eccentric valve comprising:

a valve seat including a valve hole and a seat surface formed on an outer periphery of the valve hole;

a valve element provided on its outer periphery with a sealing surface corresponding to the seat surface; and a rotary shaft including a leading end portion and a proximal end portion, the leading end portion being integrally provided with the valve element to rotate the valve element, in which an axial line of the rotary shaft extends in parallel to a radial direction of the valve element and the valve hole and is placed eccentrically from a center of the valve hole to another radial direction of the valve hole, and the sealing surface is positioned eccentrically from the axial line of the rotary shaft to a direction in which the axial line of the valve element extends such that the valve element is rotated by rotation of the rotary shaft between a fully-closed position where the valve element is seated on the valve seat and a fully-open position where the valve element is furthest away from the valve seat, wherein the double eccentric valve comprises:

a drive source to generate a drive force to rotate the rotary shaft;

a valve gear integrally provided with the proximal end portion of the rotary shaft to receive the drive force for rotating the rotary shaft and provided with a teeth part including a plurality of teeth on a part of an outer periphery;

a bearing placed on a side of the proximal end portion of the rotary shaft to rotatably support the rotary shaft with the leading end portion thereof as a free end in cantilever configuration;

a return spring to apply, to the valve gear, a spring force of rotating the rotary shaft in a direction to close the valve element;

a full-close stopper to which a part of the valve gear is contacted to restrict rotation of the valve gear with the rotary shaft while the valve element is placed in the fully-closed position, and an intermediate gear to transmit the drive force of the drive source to the valve gear, the part of the valve gear is configured to be contacted to the full-close stopper by the spring force applied to the valve gear during non-driving of the drive source to apply the moment acting on the valve gear to the rotary shaft at a contact point of the valve gear with the full-close stopper as a fulcrum, so that the rotary shaft is tilted in its axial direction toward the valve seat to press the valve element against the valve seat at a contact point with the bearing as a fulcrum, a part of the teeth part of the valve gear is configured to be contacted with a part of the intermediate gear by the spring force applied to the valve gear during driving of the drive source to apply the moment acting on the valve gear to the rotary shaft at the contact point of the valve gear with the intermediate gear as the fulcrum, so that the rotary shaft is urged in a direction to be tilted in its axial direction toward the valve seat at the contact point with the bearing as the fulcrum, in a state where the valve element is placed in the fully-closed position and the valve gear fixed to the proximal end portion of the rotary shaft is seen from a side of the proximal end portion centering about the rotary shaft, when an orthogonal coordinate system is assumed with the axial line of the rotary shaft as the origin, an X axis as a horizontal direction, and a Y axis as a vertical direction, a first quadrant is a part defined by a +X axis and a +Y axis, a second quadrant is a part defined by a −X axis and the +Y axis, a third quadrant is a part defined by the −X axis and a −Y axis, and a fourth quadrant is a part defined by the +X axis and the −Y axis, the valve seat and the valve element are placed in the third quadrant and the fourth quadrant, and a contact point of a part of the valve gear and the full-close stopper is placed in the second quadrant or the third quadrant so that the valve gear is subjected to the spring force in a direction to rotate in a counter-clockwise direction, and the valve element is configured to rotate between the fully-closed position in the third quadrant and the fourth quadrant and the fully-open position in the second quadrant and the third quadrant and the contact point of the part of the teeth part of the valve gear and the part of the intermediate gear is placed in the second quadrant or the third quadrant during rotation of the valve element.

\* \* \* \* \*